(12) United States Patent
Niehues

(10) Patent No.: US 10,024,757 B1
(45) Date of Patent: Jul. 17, 2018

(54) NON-UNIFORM SAMPLING IN BANDWIDTH CONSTRAINED DATA ACQUISITION SYSTEMS

(71) Applicant: United Launch Alliance, LLC, Centennial, CO (US)

(72) Inventor: John Niehues, Denver, CO (US)

(73) Assignee: UNITED LAUNCH ALLIANCE, L.L.C., Centennial, CO (US)

( * ) Notice: Subject to any disclaimer, the term of this patent is extended or adjusted under 35 U.S.C. 154(b) by 0 days.

(21) Appl. No.: 15/586,481

(22) Filed: May 4, 2017

(51) Int. Cl.
| | |
|---|---|
| H03M 1/06 | (2006.01) |
| G01M 7/02 | (2006.01) |
| G06F 17/18 | (2006.01) |
| G06T 15/50 | (2011.01) |
| G01P 15/00 | (2006.01) |

(52) U.S. Cl.
CPC ............ *G01M 7/025* (2013.01); *G06F 17/18* (2013.01); *G06T 15/503* (2013.01); *G01P 15/00* (2013.01)

(58) Field of Classification Search
CPC ...... G01M 7/025; G06F 17/18; G06T 15/503; G01P 15/00
USPC ........................................ 341/143, 144, 123
See application file for complete search history.

(56) References Cited

U.S. PATENT DOCUMENTS

| | | | | |
|---|---|---|---|---|
| 5,963,160 | A * | 10/1999 | Wilson | H03H 17/06 341/143 |
| 6,005,664 | A * | 12/1999 | Korenberg | G01J 9/02 356/451 |
| 6,526,356 | B1 | 2/2003 | Dimaggio et al. | |
| 6,681,634 | B2 | 1/2004 | Sabini et al. | |
| 7,756,648 | B1 | 7/2010 | Vaidyanathan et al. | |
| 7,861,593 | B2 | 1/2011 | Bougaev et al. | |
| 7,916,303 | B2 | 3/2011 | Ronnekleiv et al. | |
| 8,049,148 | B2 | 11/2011 | Facciano et al. | |
| 8,563,909 | B2 | 10/2013 | Janiak et al. | |
| 8,631,059 | B2 * | 1/2014 | Chan | H03H 17/028 708/313 |
| 8,659,422 | B2 | 2/2014 | Tracy et al. | |
| 8,659,975 | B2 | 2/2014 | Greenleaf et al. | |

(Continued)

FOREIGN PATENT DOCUMENTS

CN     102735267     10/2012

OTHER PUBLICATIONS

Hu et al., "A Non-Uniformly Under-Sampled Blade Tip-Timing Signal Reconstruction Method for Blade Vibration Monitoring," PMC, 2015, vol. 15(2), pp. 2419-2437, 13 pages.

(Continued)

*Primary Examiner* — Brian Young
(74) *Attorney, Agent, or Firm* — Sheridan Ross P.C.

(57) ABSTRACT

Systems and methods for sampling data in bandwidth constrained data acquisition systems are provided. More specifically, the method may include selecting an anti-aliasing filter corner frequency equal to a first frequency, selecting an oversampling rate that is greater than a data sample transmission bandwidth, wherein the data sample transmission bandwidth is a data sample transmission rate from a data acquisition system to a receiving entity for data samples acquired from a sensor and having a selected sample resolution, acquiring data samples at the oversampling rate with the data acquisition system, and transmitting a fraction of the acquired data samples in accordance with the data sample transmission bandwidth.

19 Claims, 26 Drawing Sheets

(56) References Cited

U.S. PATENT DOCUMENTS

2007/0083345 A1    4/2007    Fowell
2010/0002541 A1    1/2010    Ozdemir et al.
2013/0268154 A1    10/2013    Kreitmair-Steck
2014/0324392 A1    10/2014    Ogihara

OTHER PUBLICATIONS

Bretthorst, "Nonuniform Sampling: Bandwidth and Aliasing," paper to appear in: Maximum Entropy and Bayesian Methods, G. Erickson, Kluwer, 2000, 30 pages.

Litt et al., "A Survey of Intelligent Control and Health Management Technologies for Aircraft Propulsion," NASA, 2005, retrieved from https://ntrs.nasa.gov/archive/nasa/casi.ntrs.nasa.gov/20050175887.pdf, retrieved on Aug. 23, 2017, 26 pages.

Chatterjee, et al., "Effect of high-frequency low-amplitude vibration on the performance of a class of semi-active base isolation systems with on-off damping," Journal of Sound and Vibration, 2004, vol. 274, pp. 893-914, 22 pages.

Psimoulis et al., "Measurement of deflections and of oscillation frequencies of engineering structures using Robotic Theodolites (RTS)," Engineering Structures, 2007, vol. 29, pp. 3312-3324.

\* cited by examiner

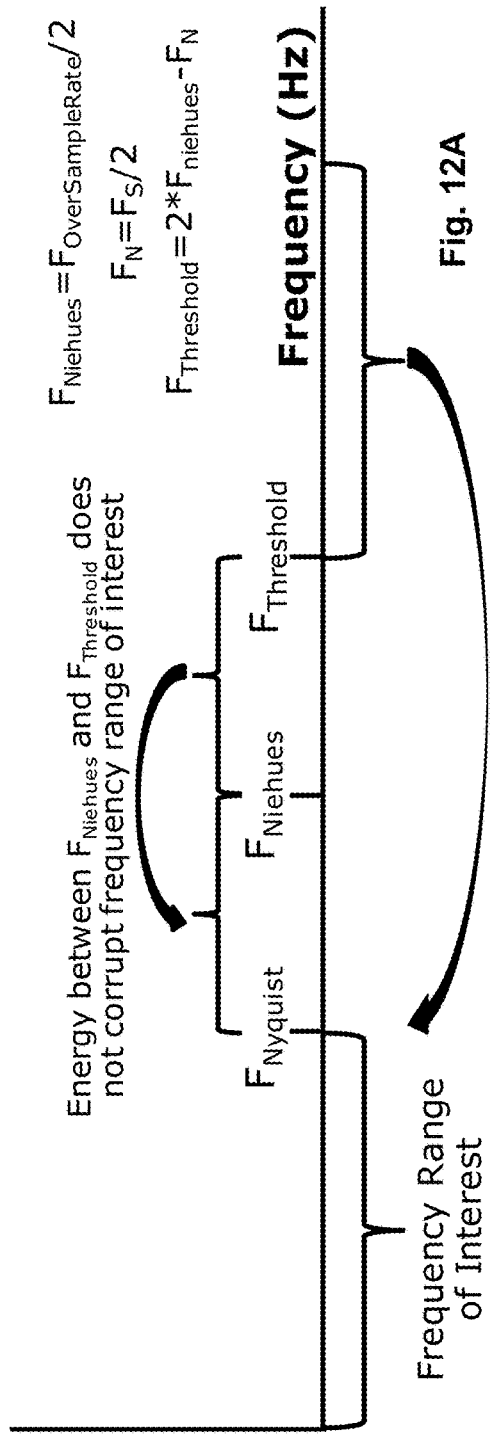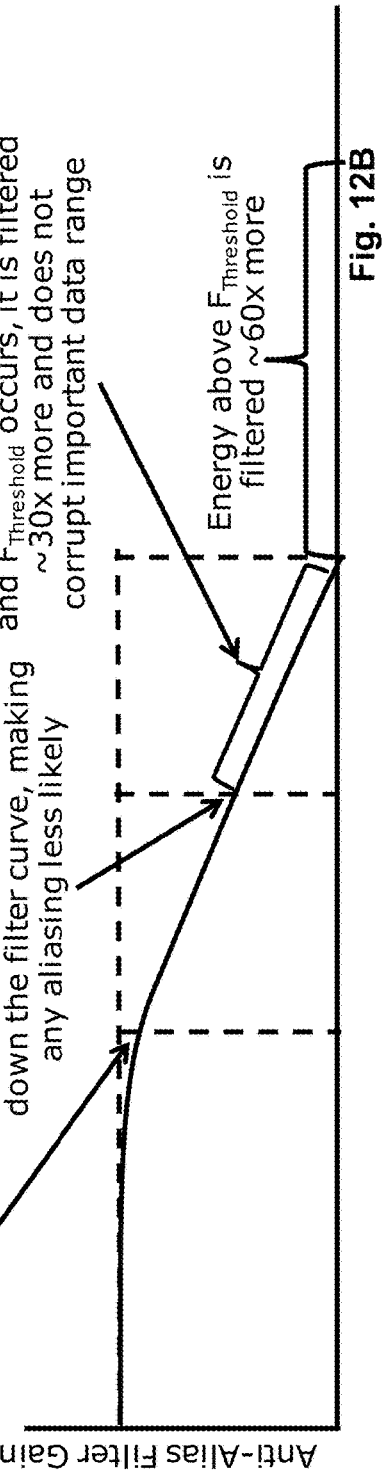

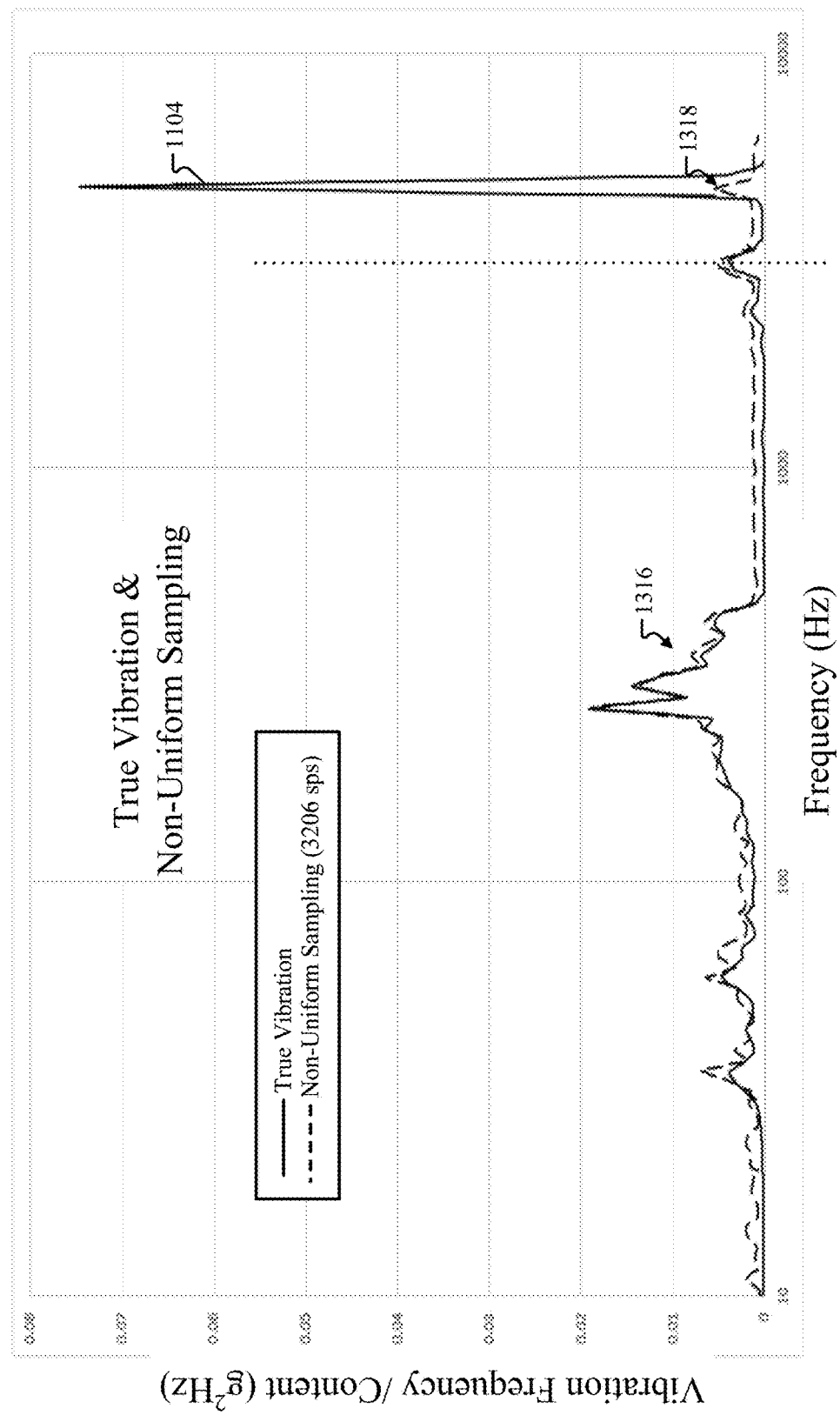

US 10,024,757 B1

NON-UNIFORM SAMPLING IN BANDWIDTH CONSTRAINED DATA ACQUISITION SYSTEMS

FIELD OF THE DISCLOSURE

The disclosure relates to systems and methods for sampling data in bandwidth constrained data acquisition systems.

BACKGROUND

Data acquisition and analysis is an important part of many test and evaluation plans for proving component health under real-word situations and further improving component longevity. Launch Vehicles, such as rockets, experience vibration of varying frequencies and amplitudes due in part to engine combustion, liftoff acoustics, aerodynamic effects, and pyrotechnic events. Thus, there is an ongoing need to measure vibrations during flight, transmit vibration measurements to a ground station, and characterize and understand the vibrations to develop test requirements for components, such as avionics, propulsion, ordnance, etc. Similarly, there is an ongoing need to measure vibrations during ground test where the vibration in flight is replicated on an electro dynamic shaker. Moreover, there is a need to monitor vehicle health in order to rapidly diagnose anomalies should such anomalies appear.

When acquiring samples, or measurements, that vary over time in order to characterize the vibration that may be affecting a launch vehicle, such samples may be acquired from one or more accelerometers or displacement sensors that measure motion. Such time domain measurements may then be transformed into the frequency domain for analysis. Aliasing of one or more frequencies present in the vibration, or acceleration, poses a risk of corrupting data such that high frequency vibrations may appear as low frequency vibrations, for example. As illustrated in FIG. 1A, one or more samples 108 of the time varying signal 104 may be acquired. As one example, the time varying signal 104 may be indicative of a vibration occurring at a launch vehicle during flight. Although one or more samples 108 of the time varying signal 104 may be acquired, the frequency, or rate, at which the samples are acquired may play a role in corrupting such measurements when the one or more samples 108 of the time varying signal 104 are used to reconstruct and/or characterize the time varying signal 104. Thus, improperly acquired samples 108 of the time varying signal 104 may lead to aliasing such that a signal 112 having a frequency different from the frequency of the time varying signal 104 is reconstructed.

Current vibration measurement solutions utilize uniform sampling, as depicted in FIG. 1B, to acquire measurement samples 116 at a uniform sample rate with a constant time between samples and in order to collect valid data up to a frequency dependent on the defined sample rate. Further, a frequency, or rate, at which the uniformly spaced samples are acquired may account for the effects of aliasing of a signal having a particular known frequency of interest. That is, generally accepted sampling theory states that to collect valid data up to a defined frequency, the data (if uniformly sampled) must be sampled at a rate at least twice that of the defined frequency. This required sample rate is known as "the Nyquist rate." As an example, to measure a vibration occurring at 2,000 Hz (that is 2,000 vibrations per second), the vibration must be sampled at a rate that is faster than 4,000 samples per second. However, high frequency vibration cycles occurring above 2,000 Hz may be acquired in such measurements and may lead to data corruption and/or an improper data interpretation. For example, FIG. 2 depicts a representation of a signal 204 in the time domain and in the frequency domain. The signal 204 includes content at various frequencies below 1,000 Hz as well as content at various frequencies above 1,000 Hz. When sampled, content occurring at a frequency above the Nyquist rate, such as frequencies 212A and 212B, may fold over and appear as if such content exists in the frequency band from 0 Hz to the frequency of the Nyquist rate, as depicted by the peaks 216A and 216B. In other words, content occurring at a frequency above the Nyquist rate may corrupt the signal content when such content is reconstructed.

Although anti-aliasing filters may be utilized to reduce a likelihood of aliased content, signals having frequency content in the vicinity of an upper frequency of the antialiasing filter or higher frequency with significantly larger amplitude than in the frequency range of interest may still have a high potential of aliasing, as depicted in FIGS. 3A and 3B.

SUMMARY

Uniform sampling techniques sample at high rates and generally require the use of anti-aliasing hardware resulting in heavy sampling hardware, expense, and fewer measurement opportunities, while still having to deal with a limited bandwidth requirement. That is, limited telemetry bandwidth is available to send data, such as vibration measurements, from rockets, spacecraft, aircraft, land-based vehicles, seagoing vehicles, test sleds, or other test vehicles, to the ground stations for storage and analysis; bandwidth may be limited due to power and telemetry speed. Further, technically challenging and costly data acquisition systems with anti-aliasing hardware may be needed to sample data at a rate fast enough to yield useable results. Within various measurement environments, such as on the ground or in flight for example, heavy, expensive, and complex anti-aliasing filters may be required on such hardware, and because bandwidth limitations exist, extensive costs and latent risk may be incurred determining which items should be measured and when such measurements should be acquired. Lastly, uniform sampling techniques put the same emphasis on measuring the "peaks" in frequency domain data as the "zeros;" that is, an excessive amount of effort is put into data that is less relevant. Thus, there exists a need to measure high frequency content, such as high frequency vibrations, in bandwidth constrained environments while accounting for and preventing aliasing affects.

In accordance with embodiments of the present disclosure, Non-Uniform Sampling (NUS) techniques may be implemented to measure high frequency vibration with less bandwidth. That is, intelligently designed variable time intervals allow NUS technologies to be used to sample high frequency data at an effective rate lower than the Nyquist rate, while capturing enough information to adequately characterize broadband data and/or enable near-perfect signal reconstruction. The application of NUS to vibration-related applications is unique due to unknown frequency content of vibrations (e.g. broadband characteristics), effects of aliasing and working with analog anti-aliasing filters, the need for real-time measurements during finite durations (for example, flight vibration changes over time), measurements of continuous physical systems (e.g., no digital compression), and characterization of overall energy in frequency bands for vibration response—that is, amplitude is often important in addition to frequency. NUS allows for high frequency data to be adequately measured using significantly less bandwidth and with simpler anti-aliasing filters. Moreover, data can effectively be under sampled without loss of relevant information and without aliasing. Anti-aliasing filters can be simplified and potentially eliminated and NUS places an emphasis on measuring "peaks" in the data, not "zeros."

In accordance with embodiments of the present disclosure, a system is provided. The system may include a sensor and a data acquisition system adapted to receive sensor data from the sensor and transmit the received sensor data to a receiving entity. The data acquisition system may include at least one processor, and memory storing one or more program instructions that when executed by the at least one processor, execute the steps of receiving a non-uniform data sampling plan indicating when to sample sensor data from the sensor in a non-uniform manner, and acquiring sampled data in accordance with the non-uniform data sampling plan. Aspects of the above embodiment may include selecting an oversampling rate whose associated bandwidth is greater than or equal to a data sample transmission bandwidth, wherein the data sample transmission bandwidth is a data sample transmission rate from the data acquisition system to the receiving entity for data samples acquired from the sensor and having a selected sample resolution, and acquiring sampled data at the oversampling rate. Additional aspects of the above embodiment may include where the sample resolution is a number of bits per data sample. Further yet, additional aspects of the above embodiment may include discarding a fraction of the acquired data samples in accordance with a parameter of the non-uniform data sampling plan. Further still, additional aspects of the above embodiment may include where the acquired data samples are discarded in a randomized manner. Further yet, additional aspects of the above embodiment may include a data analysis system adapted to receive the sampled data having the oversampling rate that is greater than or equal to the data sample transmission bandwidth, the data analysis system including at least one processor, and memory storing one or more program instructions that when executed by the at least one processor, execute the steps of: receiving the sampled data having the oversampling rate that is greater than a data sample transmission bandwidth, and identifying peak frequency information from spectral content of the received sample data, wherein the peak frequency information includes at least one frequency that is greater than a Nyquist frequency associated with the data sample transmission bandwidth of the data acquisition system. Further still, additional aspects of the above embodiment may include where the sensor senses acceleration. Further yet, additional aspects of the above embodiment may include where the system resides at one or more of a launch vehicle or an electro-dynamic shaker. Further yet, additional aspects of the above embodiment may include where an amount of time between adjacent data samples varies between adjacent samples.

In accordance with embodiments of the present disclosure, a method for obtaining data samples by a data acquisition system is provided. The method may include selecting an anti-aliasing filter corner frequency equal to a first frequency, selecting an oversampling rate that is greater than or equal to a data sample transmission bandwidth, wherein the data sample transmission bandwidth is a data sample transmission rate from a data acquisition system to a receiving entity for data samples acquired from a sensor and having a selected sample resolution, acquiring data samples at the oversampling rate with the data acquisition system, and transmitting a fraction of the acquired data samples in accordance with the data sample transmission bandwidth. Aspects of the above embodiment may include acquiring the data samples at a sampling rate exceeding the transmission rate of the data acquisition system. Additional aspects of the above embodiment may include selecting an attenuation requirement for spectral content above the oversampling rate less the first frequency, and selecting a type and order of the anti-aliasing filter such that the attenuation requirement for the spectral content above the oversampling rate less the first frequency is met. Further yet, additional aspects of the above embodiment may include where the fraction of the acquired data samples is less than or equal to the data sample transmission bandwidth divided by the oversampling rate. Further still, additional aspects of the above embodiment may include an amount of time between adjacent data samples varies between adjacent samples. Further yet, additional aspects of the above embodiment may include identifying peak frequency information from spectral content of the acquired data samples, wherein the peak frequency information includes at least one frequency that is greater than the data sample transmission bandwidth of the data acquisition system. Further still, additional aspects of the above embodiment may include comparing the peak frequency information to the corner frequency, and determining that the anti-aliasing filter is deficient. Further yet, additional aspects of the above embodiment may include acquiring the data samples from a sensor that senses acceleration or position, such as an accelerometer or displacement sensor respectively.

In accordance with embodiments of the present disclosure, a method for obtaining data samples by a data acquisition system is provided. The method may include selecting an anti-aliasing filter corner frequency equal to a first frequency, selecting an oversampling rate that is greater than or equal to a data sample transmission bandwidth, wherein the data sample transmission bandwidth is a data sample transmission rate from a data acquisition system to a receiving entity for data samples acquired from a sensor and having a selected sample resolution, determining a sample timing associated with each data sample to acquire, acquiring a plurality of data samples at the determined sample timing, and transmitting the acquired plurality of data samples to the receiving entity. Aspects of the above embodiment may include where an amount of time between adjacent data samples varies between adjacent samples. Additional aspects of the above embodiment may include acquiring the data samples from a sensor that senses acceleration or position, such as an accelerometer or displacement sensor respectively. Further yet, additional aspects of the above embodiment may include identifying peak frequency information from spectral content of the acquired data samples, wherein the peak frequency information includes at least one frequency that is greater than a Nyquist frequency associated with the data sample transmission bandwidth of the data acquisition system. Further still, additional aspects of the above embodiment may include comparing the peak frequency information to the corner frequency, and determining that the anti-aliasing filter is deficient.

In accordance with embodiments of the present disclosure, a system for characterizing spectral content of a dynamically changing signal is provided. The system may include a sensor and a data acquisition system adapted to acquire sensor data in a non-uniform manner from the sensor and transmit the received sensor data as a plurality of data samples to a receiving entity. The receiving entity may receive the plurality of data samples, identify peak frequency information from spectral content of the acquired plurality of data samples, compare the peak frequency information to a corner frequency of an anti-aliasing filter, and determine that the anti-aliasing filter is adequate or deficient in some manner. Aspects of the above embodiment may include where the plurality of data samples is from a sensor that senses acceleration or position, such as an accelerometer or displacement sensor respectively. Aspects of the above embodiment may be performed by a data processor.

In accordance with embodiments of the present disclosure, a method for characterizing spectral content of a dynamically changing signal is provided. The method may include receiving a plurality of data samples, where the plurality of data samples was acquired in a non-uniform manner, identifying peak frequency information from spectral content of the acquired plurality of data samples, comparing the peak frequency information to a corner frequency of an anti-aliasing filter, and determining that the anti-aliasing filter is adequate or deficient in some manner. Aspects of the above embodiment may include where the plurality of data samples is from a sensor that senses acceleration or position, such as an accelerometer or displacement sensor respectively. Aspects of the above embodiment may be performed by a data processor.

In accordance with embodiments of the present disclosure, a computer-readable device and/or a computer-readable medium may include instructions that when executed by a processor, cause the processor to execute one or more methods described above.

BRIEF DESCRIPTION OF THE DRAWINGS

Exemplary embodiments of the present disclosure are described in conjunction with the appended figures wherein:

FIGS. 12A-12B depict a first frequency chart and a third frequency attenuation chart in accordance with an exemplary embodiment of the present disclosure;

FIGS. 13A-13C depict second uniform sampling vs. non-uniform sampling charts with a bad anti-alias filter in accordance with an exemplary embodiment of the present disclosure;

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1A:
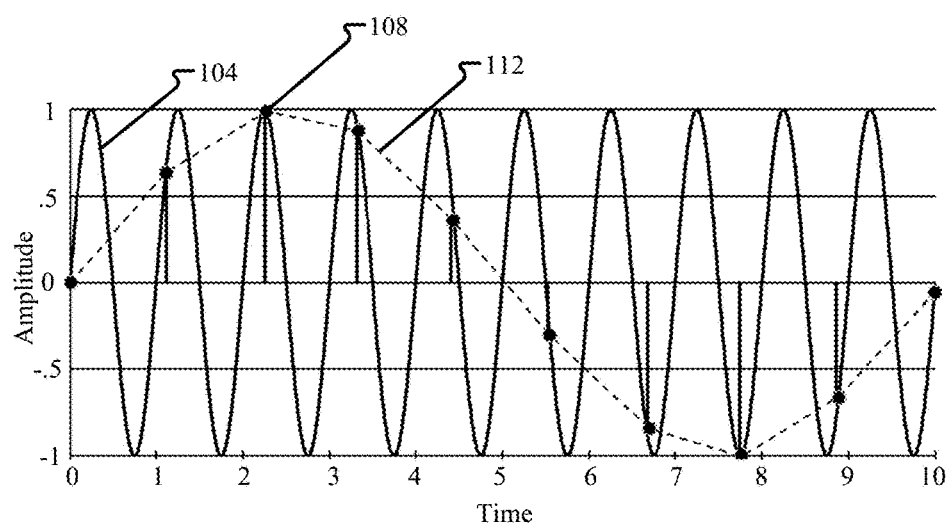
FIGS. 1A and 1B depict first and second uniform sampling examples.
Figure 1B:
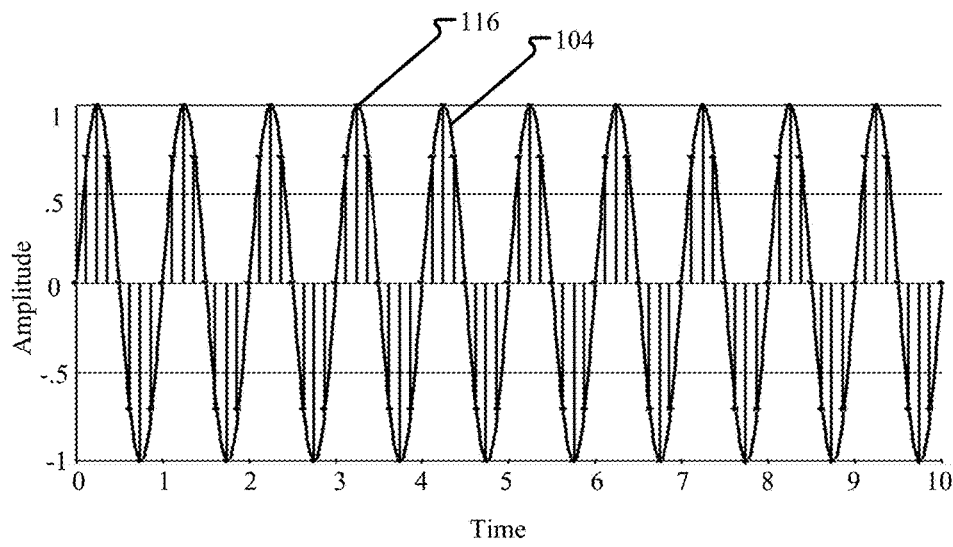
Figure 2:
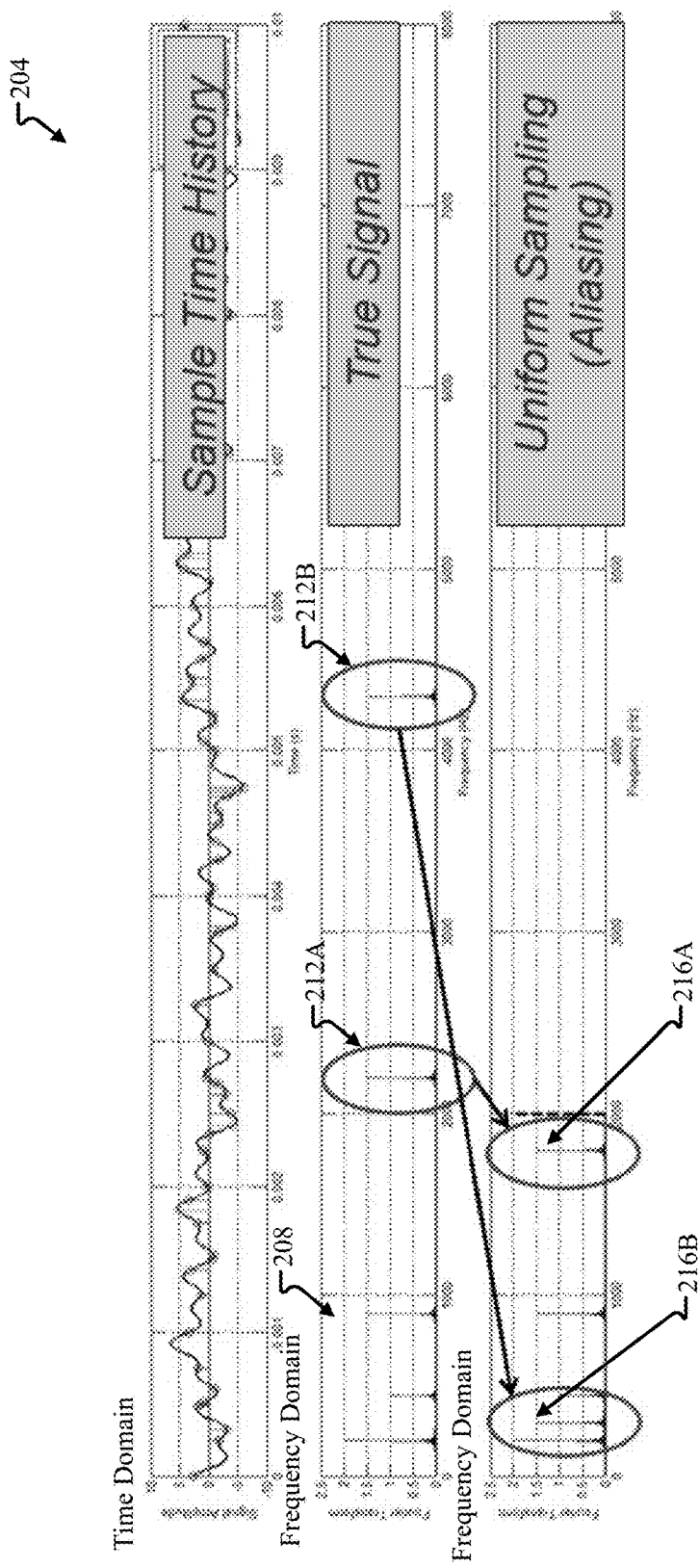
FIG. 2 depicts a third uniform sampling example.
Figures 3A, 3B:
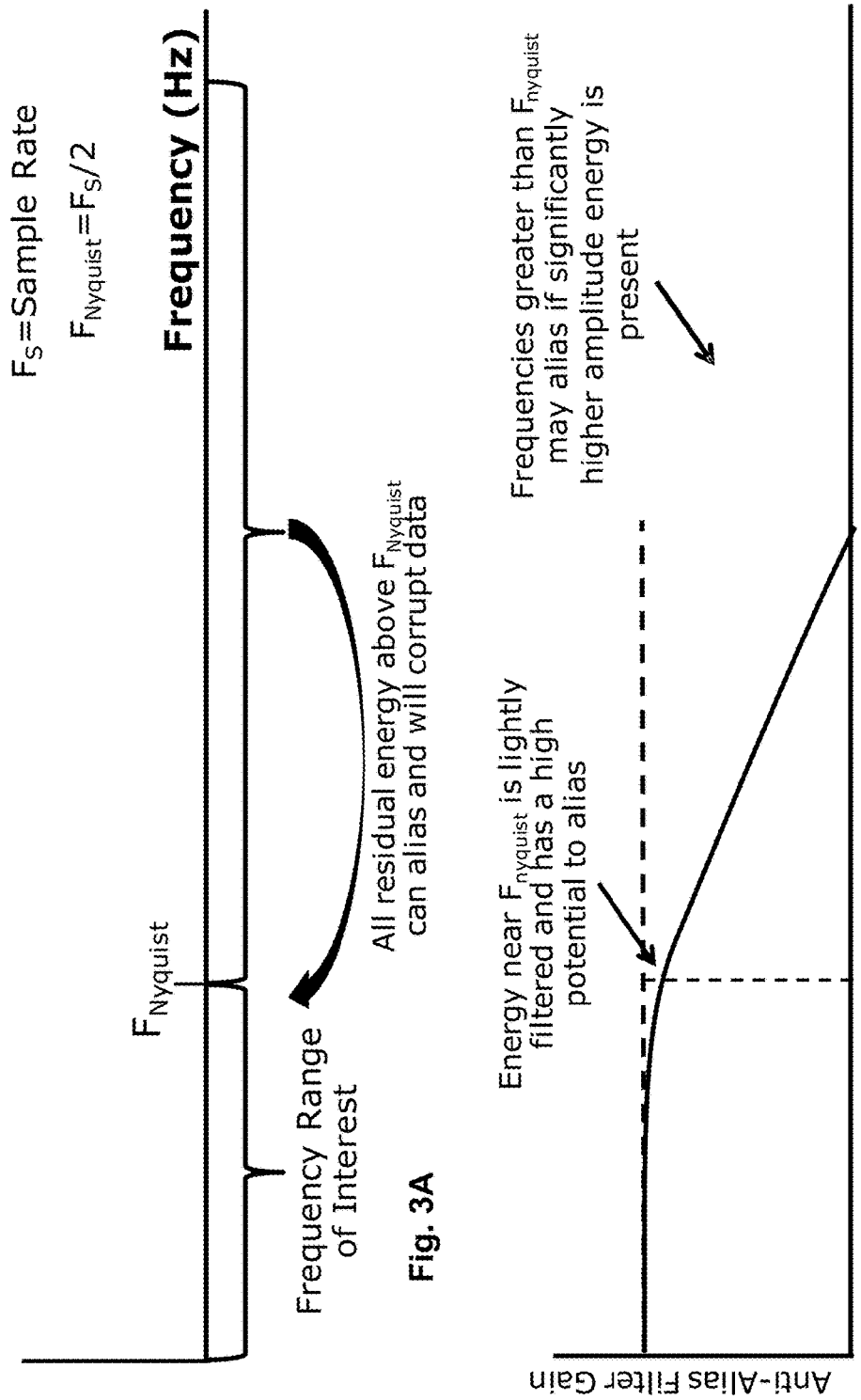
FIGS. 3A-3B depict anti-aliasing filtering utilized with uniform sampling.
Figure 4:
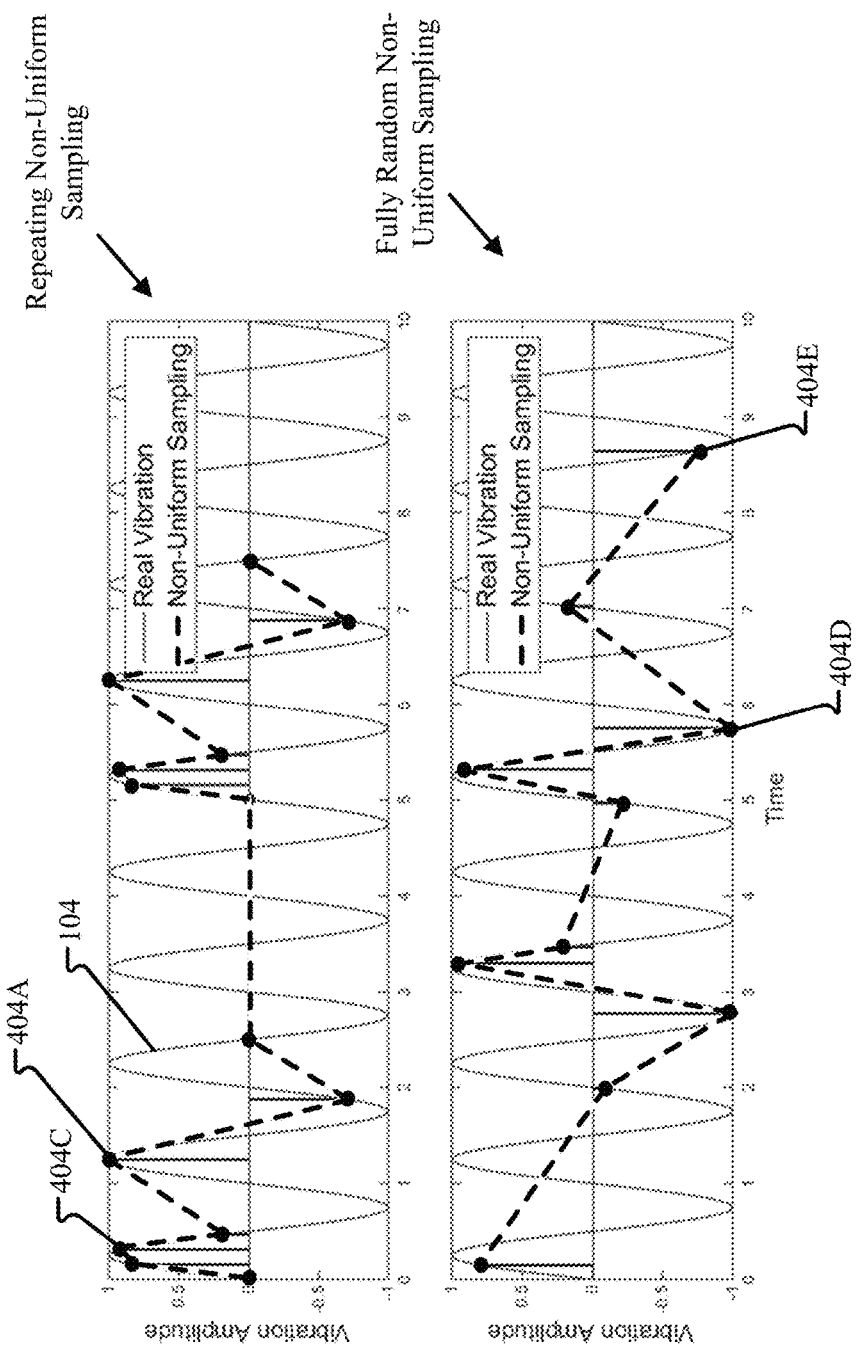
FIG. 4 depicts a first non-uniform sampling waveform in accordance with at least some embodiments of the present disclosure.
Figure 5:
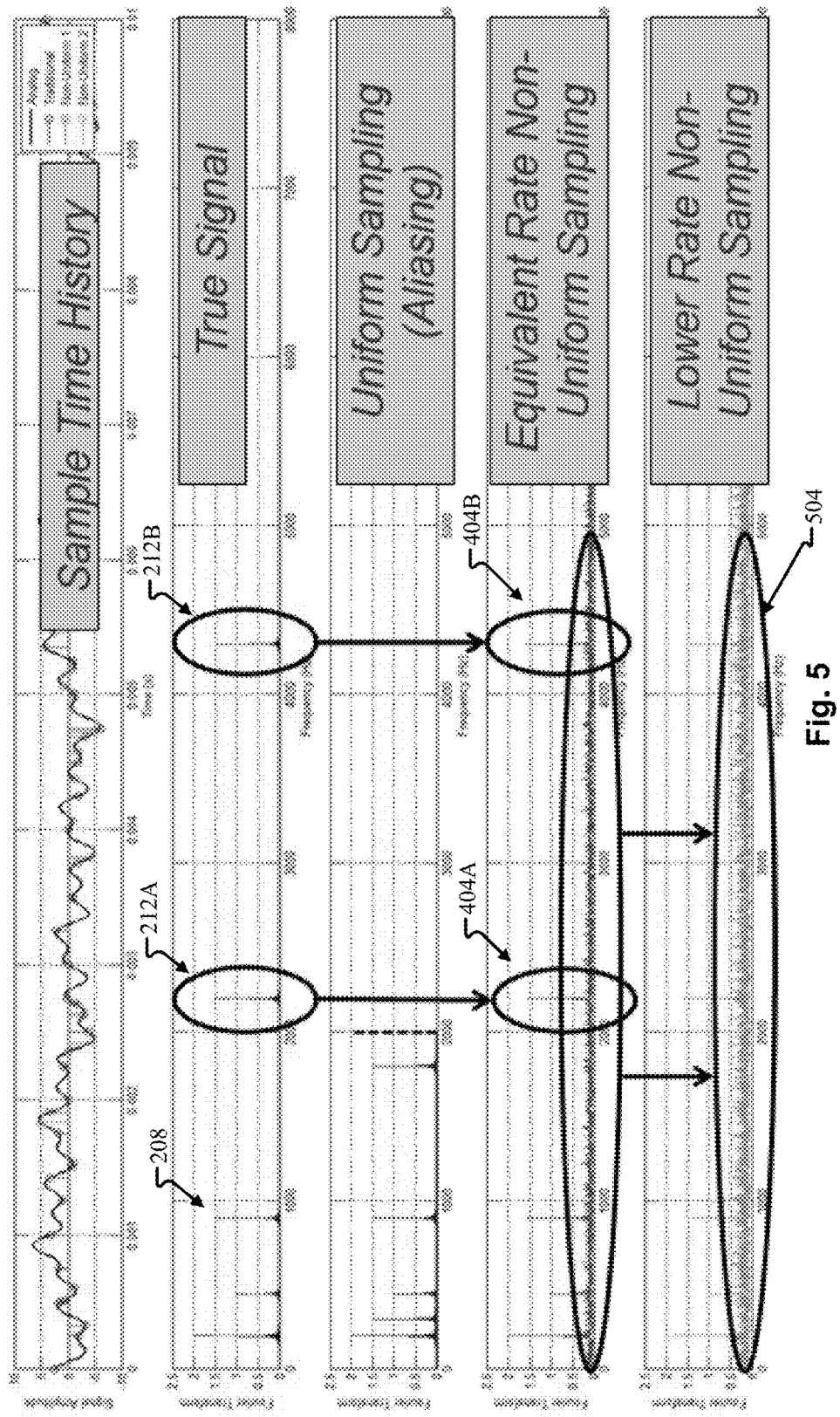
FIG. 5 depicts second and third non-uniform sampling waveforms in accordance with at least some embodiments of the present disclosure.

FIG. 4 depicts an example of non-uniform sampling, in accordance with embodiments of the present disclosure. That is, FIG. 4 depicts a similar time varying signal 104 as FIGS. 1A-1B; however, unlike FIGS. 1A-1B, the time varying signal 104 is sampled utilizing non-uniform sampling techniques at one or more non-uniform locations 404A-E. Accordingly, and as depicted in FIG. 5, by implementing NUS techniques described herein, frequency content that is responsible for aliasing in uniform sampling systems may not cause the same issues in NUS systems. That is, unlike uniform sampling systems, the frequency content above the same Nyquist rate appears as the actual frequency content when reconstructed. For example, the frequency signal 212A and 212B are reconstructed at the appropriate locations 404A and 404B. In addition, performing NUS techniques at a lower rate than regular uniform sampling techniques results in accurate frequency reconstruction while sacrificing a noise floor 504. Thus, accurate and usable data may be obtained while sampling at a rate that is much lower than the equivalent Nyquist sampling rate.

Figure 6:
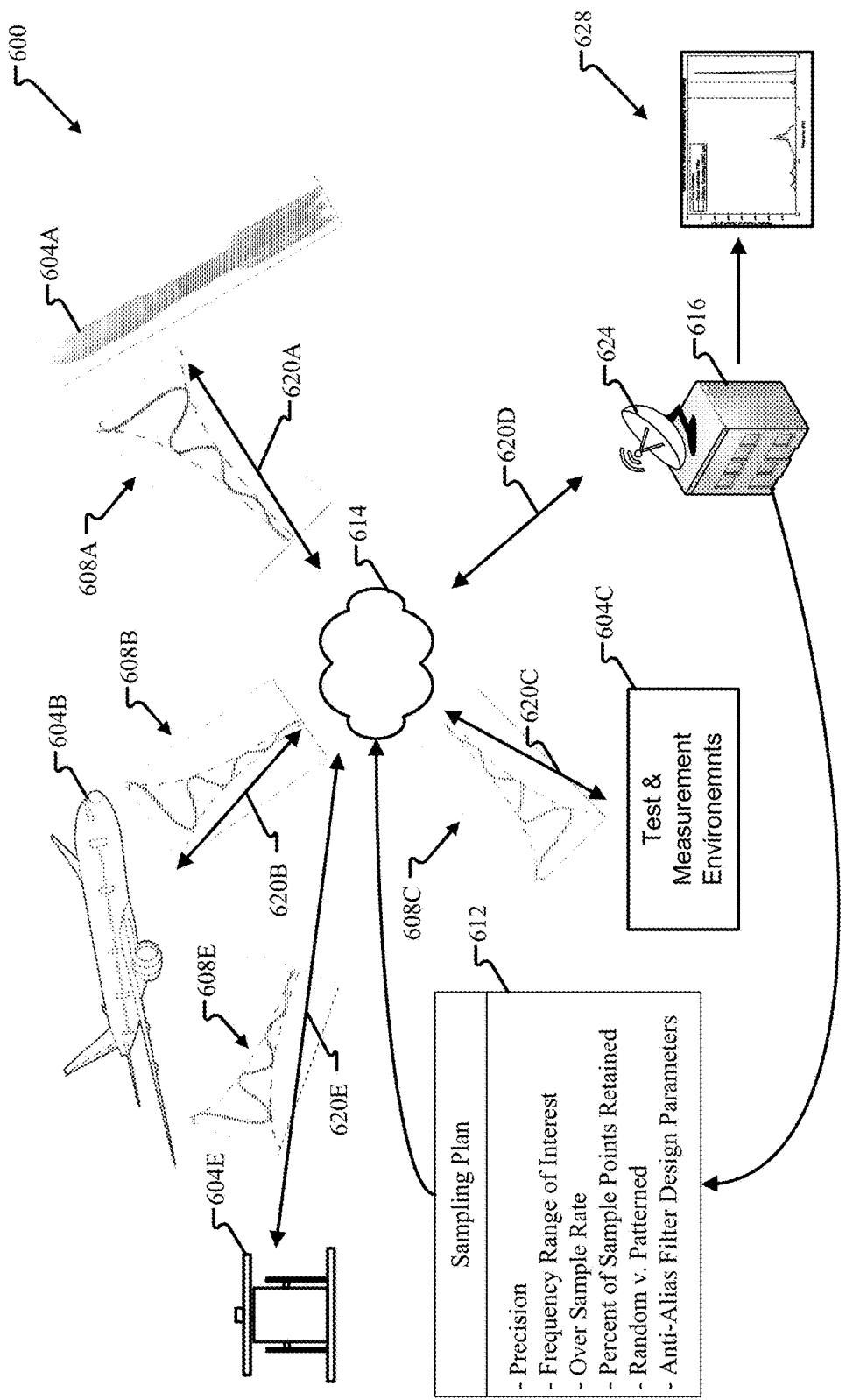
FIG. 6 depicts a first system diagram illustrating details of a non-uniform sampling system in accordance with an exemplary embodiment of the present disclosure.

FIG. 6 depicts details of a system 600 implementing NUS in accordance with embodiments of the present disclosure. More specifically, NUS techniques may be implemented in one or more test and measurement environments 604A-C to measure one or more quantities associated with a component of a system, and provide such sampled or measured quantities 608A-C for analysis, to a ground station 616 for example. Vibration of a component of a launch vehicle 604A is a non-limiting example of quantity that may be measured, or characterized, with the system 600. Thus, a measure of acceleration associated with something vibrating may be obtained. Such measure may be obtained from an accelerometer that measures acceleration and/or from a displacement sensor that measures position. The measurements may then be transformed from the time domain into the frequency domain to analyze and characterize vibration.

One or more of the test and measurement environments 604A-C may include hardware and/or software to implement at least a portion of a sampling plan 612. The sampling plan 612 may include details for implementing the NUS techniques based on a particular test and measurement environment as well as one or more design parameters, such as but not limited to an amount of precision (such as sample resolution in bits/second), a frequency range of interest, an over sample rate, a percent of sample points retained, details for obtaining non-uniform sampling data points (e.g., random v. patterned), and/or one or more anti-alias filter design parameters utilized in the particular test and measurement environment 604A-C. For example, data samples may be obtained following a repeating non-uniform pattern, such as depicted in FIG. 4. Alternatively, or in addition, data samples may be obtained following a fully random pattern, also depicted in FIG. 4. Thus, the data sampling plan 612 may indicate how such data samples are obtained. The sampling plan 612 may be provided by and/or to an entity, such as the ground station 616 for example; the ground station 616 may include hardware and/or software to implement at least a portion of the NUS techniques together with the test and measurement environment 604A-C. Accordingly, while the test and measurement environment 604A-C may be sampling a desired quantity of interest, the ground station 616 may be receiving measurements of the quantity of interest. The measured quantity or sampled data 608A-C may be transmitted to the ground station 616 in real time, in batched quantities, and/or following a conclusion of a particular test.

The test and measurement environments 604A-B may communicate with the ground station 616 utilizing any type of communication method. Such communication method may include communicating with a communication network 614. The communication network 614 may be any type of network familiar to those skilled in the art that can support data communications using any of a variety of commercially-available protocols, including without limitation SIP, TCP/IP, SNA, IPX, AppleTalk, and the like. Merely by way of example, the network 612 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks. Moreover, sampled data from a test and measurement environment 604A for example, may be merged into one or more multiplexed formats prior to being sent to a receiving station, such as the ground station 616. The sampled data 608A-C may be communicated over one or more communication channels 620A-C to the communication network 614 and then over a communication path 620D to the ground station 616. Alternatively, or in addition, the sampled data 608A-C may be communication directly to the ground station 616 via one or more of the communication channels 620A-C. The ground station 616 may receive the sampled data 608A-C via a receiver 624. The ground station 624, or another entity, may provide an analysis of the sampled data 608A for example, and produce a report or graphic for display to a display device.

Each of the communication pathways 620A-D may be limited in bandwidth or otherwise be bandwidth constrained. Such bandwidth limitation may be associated with or otherwise apply to a specific data channel associated with a specific sensor. Alternatively, or in addition, the bandwidth limitation may apply to a specific category of sensors or data from multiple sensors is multiplexed and provided to a ground station 616 in the multiplexed format. Thus, since data may be provided in real-time, an overall bandwidth limitation of the communication pathway or channel may limit a speed or rate at which data may be sampled.

Figure 7:
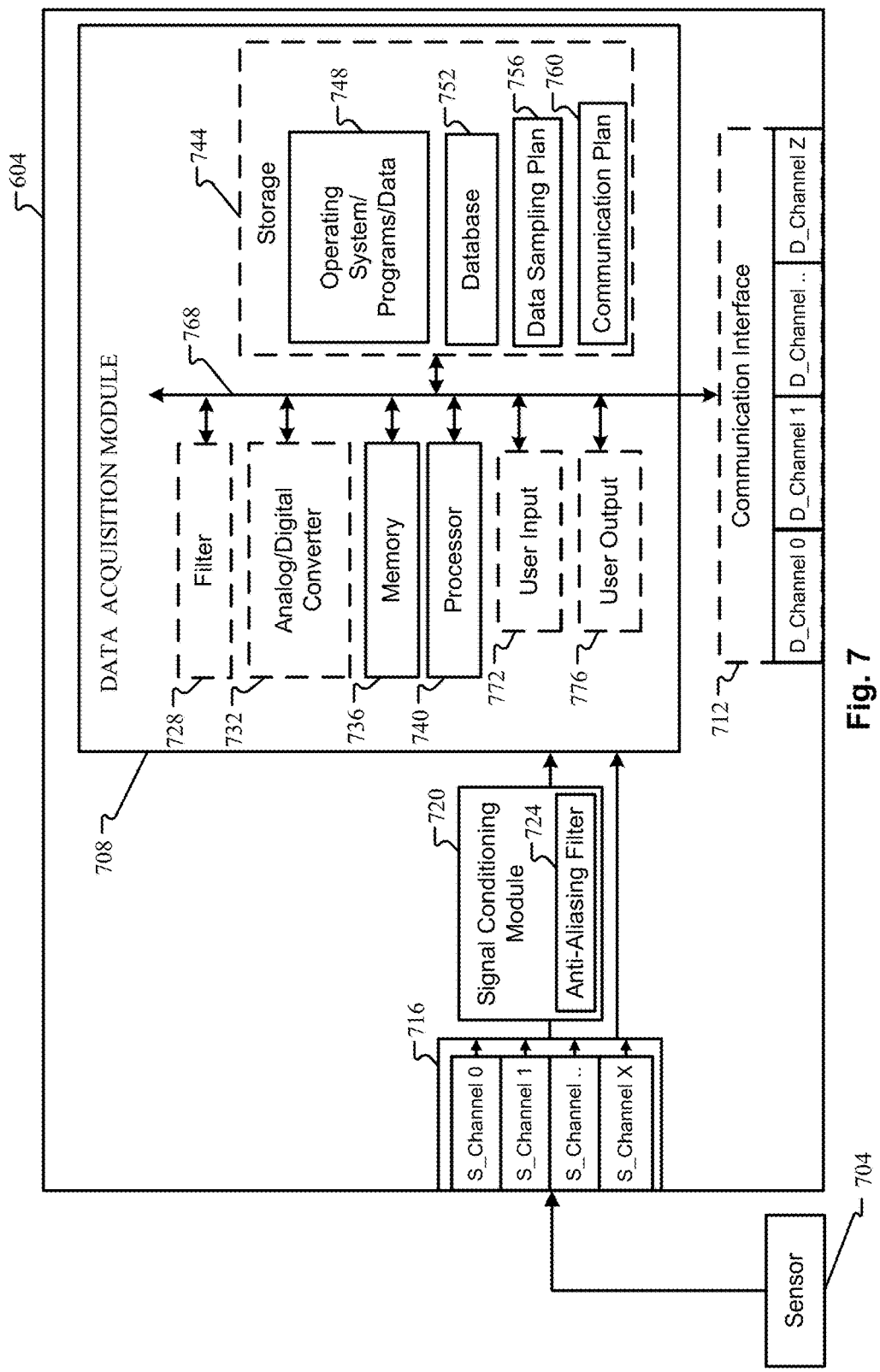
FIG. 7 depicts a first block diagram illustrating details of non-uniform sampling components in accordance with an exemplary embodiment of the present disclosure.

FIG. 7 depicts additional details of one or more components of a test and measurement environment 604 in accordance with embodiments of the present disclosure. The test and measurement environment 604 may include one or more sensors 704 and/or transducers capable of measuring a quantity of interest. The measured quantity of interest may correspond to vibration for example. The measured quantity of interest may be represented by a voltage, current, and/or other value and may be obtained by one or more channels (S_Channel 0–S_Channel X) of a signal block 716 or other measurement board of a data acquisition module 708. The measured quantity may be routed through a signal conditioning module 720 where an anti-aliasing filter 724 for example, may remove certain frequencies from, or condition, the measured quantity. The anti-aliasing filter 724 may filter the measured quantity in accordance with the data sampling plan 612 and/or design parameters of an anti-aliasing filter. Alternatively, or in addition, the signal block 716 may provide the measured quantity directly to the data acquisition module 708 such that the measured quantity is filtered by a filter 728 and/or provided to the analog-to-digital converter 732. The filter 728 may be the same as the anti-aliasing filter 724 and may filter the measured quantity in accordance with the data sampling plan 612 and/or design parameters of an anti-aliasing filter. The analog-to-digital converter 732 may convert the analog quantity representative of the measured quantity into digital format and may then store and/or transmit the measured quantity.

The data acquisition module 708 may generally include a processor/controller 740, memory 736, storage 744, user input 772, user output 776 such as a display device, in some instances a communication interface 712, the filter 728, and/or the analog-to-digital converter 732. In some instances, the data acquisition module 708 may further include the signal block 716 and the signal conditioning module 720.

The processor/controller 740 is provided to execute instructions contained within memory 736. Accordingly, the processor/controller 740 may be implemented as any suitable type of microprocessor or similar type of processing chip, such as any general-purpose programmable processor, digital signal processor (DSP) or controller for executing application programming contained within memory 736. Alternatively, or in addition, the processor/controller 740 and the memory 736 may be replaced or augmented with an application specific integrated circuit (ASIC), a programmable logic device (PLD), or a field programmable gate array (FPGA).

The memory 736 generally comprises software routines facilitating, in operation, pre-determined functionality of the data acquisition module 708. The memory 736 may be implemented using various types of electronic memory generally including at least one array of non-volatile memory cells (e.g., Erasable Programmable Read Only Memory (EPROM) cells or FLASH memory cells, etc.). The memory 736 may also include at least one array of dynamic random access memory (DRAM) cells. The content of the DRAM cells may be pre-programmed and write-protected thereafter, whereas other portions of the memory 736 may be selectively modified or erased. The memory 736 may be used for either permanent data storage or temporary data storage. Alternatively, or in addition, data storage 744 may be provided. Though shown as separate from the processor/controller 740, the memory 736 may be part of or otherwise within the processor/controller 740.

The data storage 744 may generally include storage for programs and data 748, storage for one or more modules, and storage for a database 752, storage for the data sampling plan 756, and storage for a communication plan 760. The database 752 may store data associated with the analog-to-digital converter 732; that is the database 752 may store the measure quantity of interest. The data sampling plan 756 may be same as or similar to the data sampling plan 612. The communication plan 760 may be utilized with the communication interface 712 to package the measured quantity of interest and transmit the packaged data utilizing one or more data channels (Channel 0–Channel Z). Accordingly, the communication interface 712 may allow the test and measurement environment 604 for example, to communicate over a communication network 614. Further, the test and measurement environment 604A may include a portion of, or an entirety of, the data acquisition module 708. One or more of the components of the test and measurement environment 604 may communicate with one another utilizing the communication bus 768.

The data sampling plan 756 may be uploaded and/or programmable such that the data sampling plan 756 may be customized to a particular test and measurement environment 604. That is, once a data sampling plan 756 has been described or determined, such plan may be programmed within the data acquisition module 708. Moreover, the communication plan 760 may determine how the communication interface 712 communicates with the communication interface 812 of FIG. 8 below.

Figure 8:
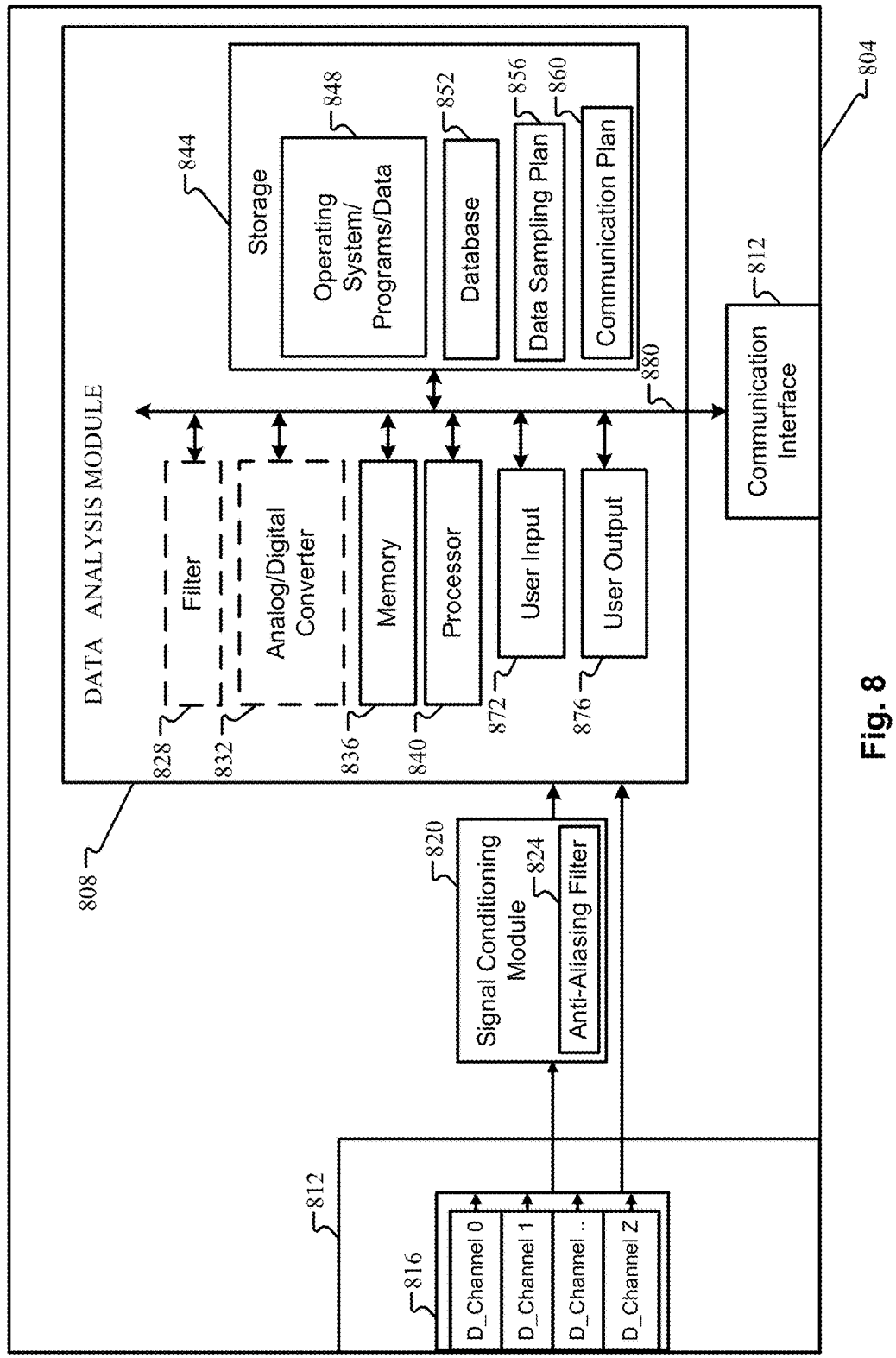
FIG. 8. depicts a second block diagram illustrating details of non-uniform sampling components in accordance with an exemplary embodiment of the present disclosure.

FIG. 8 depicts an analysis device 804 in accordance with embodiments of the present disclosure. The analysis device 804 may be located at the ground station 616; alternatively, or in addition, the analysis device 804 may be located at a location different from the ground station 616. The analysis device 804 may receive sampled data from one or more of the test and measurement environments 604A-C. Accordingly, such data may be received in realtime at the communication interface 812 of the analysis device 804. Alternatively, or in addition, the sampled data may be received in batches or otherwise. More specifically, sampled data may be provided by one or more data channels of the communication interface 812; such data may be conditioned at the signal conditioning module 820 and/or anti-aliasing filter 724 as previously described with respect to the signal conditioning module 720 and/or the anti-aliasing filter 824. The data may then be provided to the data analysis module 808 where the data may be filtered by the filter 828 and/or converted to digital form at the analog-to-digital converter 832 if not already in digital form. The data analysis module 808 may include a memory 836 that is the same as or similar to the memory 736 as previously described, a processor/controller 840 that is the same as or similar to the processor/controller 740 as previously described, the storage 844, which is the same as or similar to the storage 744 as previously described, the operating system/programs/data 848 which is the same as or similar to the operating system/programs/data 748 as previously described, the data sampling plan 856 which is the same as or similar to the data sampling plan 756 and data sampling plan 612, the communication plan 860 which is the same as or similar to the communication plan 760, the user input 872 which is the same as or similar to the user input 772 as previously described, and the user output 876 which is the same or similar to the user output 776 as previously described. The analysis device 804 and the test and measurement environment 604 may work in concert with one another; for example, the test and measurement environment 604 may provide data to the analysis device 804 in accordance with the data sampling plan 756 and the communication plan 860 such that the analysis device 804 may understand how and what was transmitted from the data acquisition module 708 of the test and measurement environment 604.

Figure 9A:
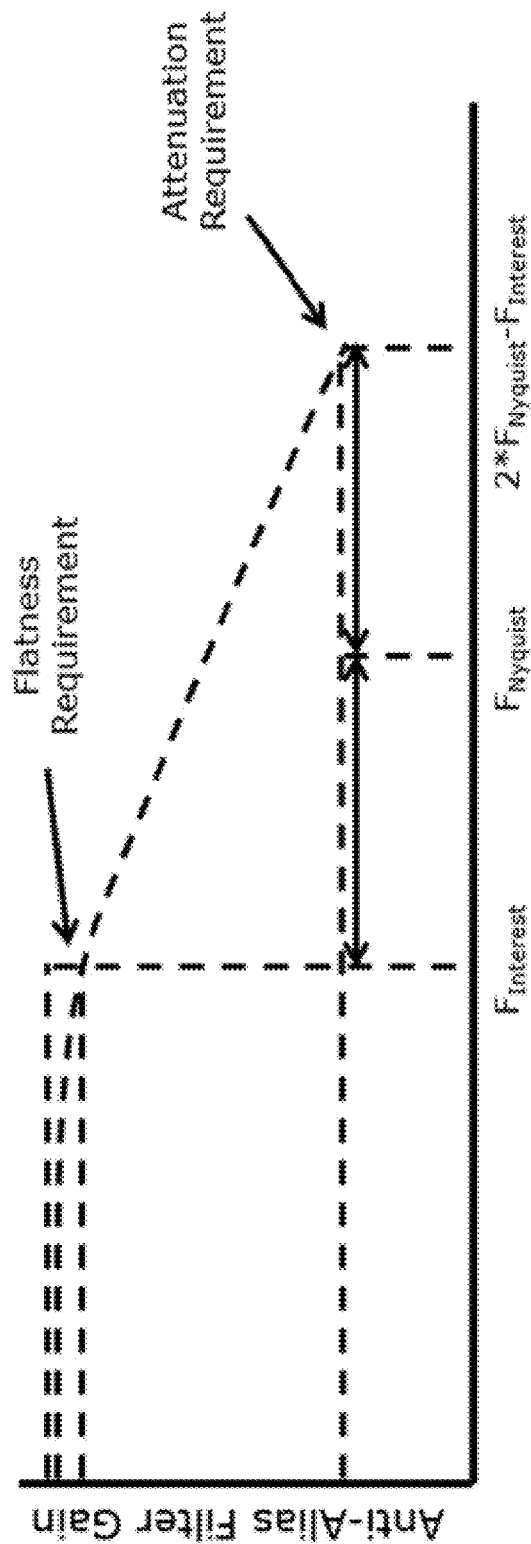
FIGS. 9A-9D depict first and second frequency attenuation charts in accordance with an exemplary embodiment of the present disclosure.

Prior to describing a data sampling plan 612 in accordance with embodiments of the present disclosure, a description of various uniform sampling components will be described as generally illustrated in FIG. 9A. Current data acquisition equipment may have a data acquisition bandwidth which may be described as a maximum number of data samples that can be measured and/or transmitted within a unit of time, such as one second. Accordingly, frequency $F_S$ may be the number of uniformly spaced samples within the unit of time, such as one second, and may be based on the data acquisition bandwidth of the system and a sample resolution. For example, a communication channel or pathway 620A may be bandwidth limited to 38000 kbs; accordingly, assuming a sample resolution, or bit depth, of 12 bits/sample, the communication channel may be limited to sending 3,166 samples/second.

The Nyquist aliasing frequency associated with uniform sampling, $F_{Nyquist}$ is equal to $F_S/2$. Accordingly, a desired upper frequency bound of information to be measured $F_{Interest}$ generally dictates a flatness requirement of an anti-aliasing filter such that data sampled up to the $F_{Interest}$ is minimally attenuated or amplified if attenuated or amplified at all. Therefore, an anti-aliasing filter may be designed such that the filter attenuates frequencies that have the potential to alias below $F_{Interest}$ which correspond to frequencies above $2*F_{Nyquist}-F_{Interest}$. Such design generally includes a type and order of anti-aliasing filter to meet the requirements of attenuation. Such a process may be highly difficult but may provide non-corrupted (e.g., non-aliased data) up to $F_{Interest}$ where the spectral characterization of the peaks and valleys up to $F_{Interest}$ are generally accurate.

Figure 9B:
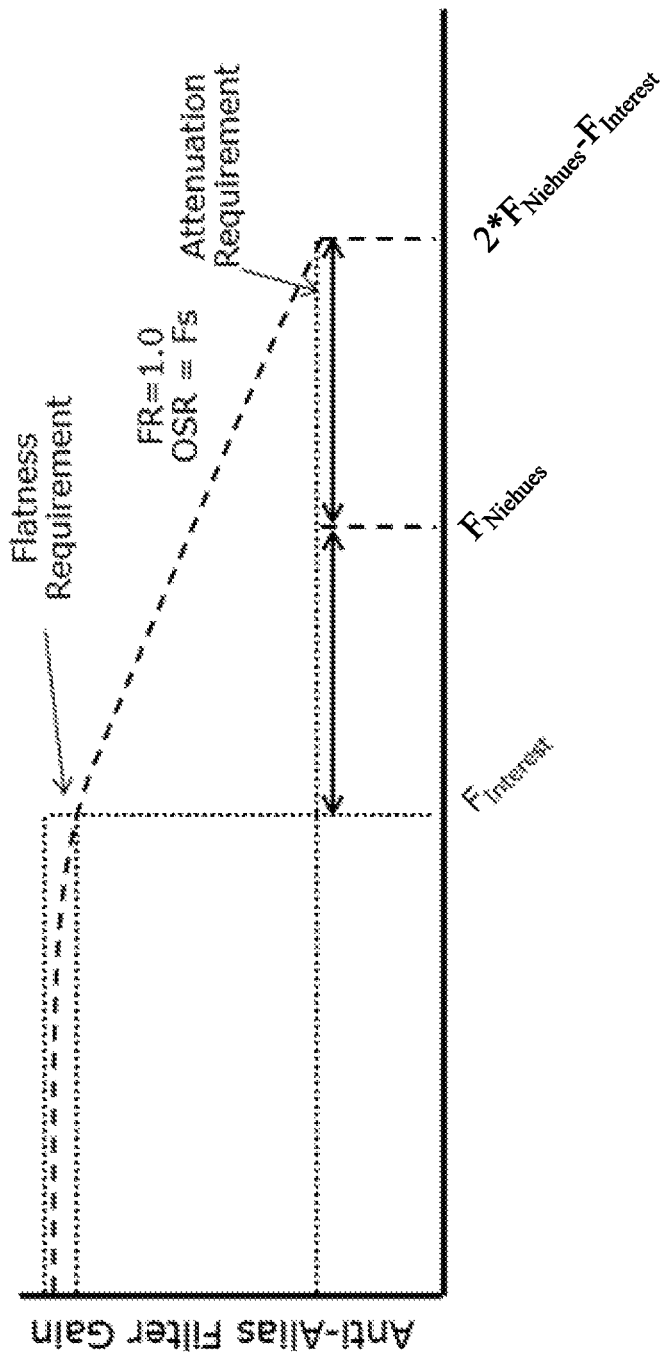
Figure 9C:
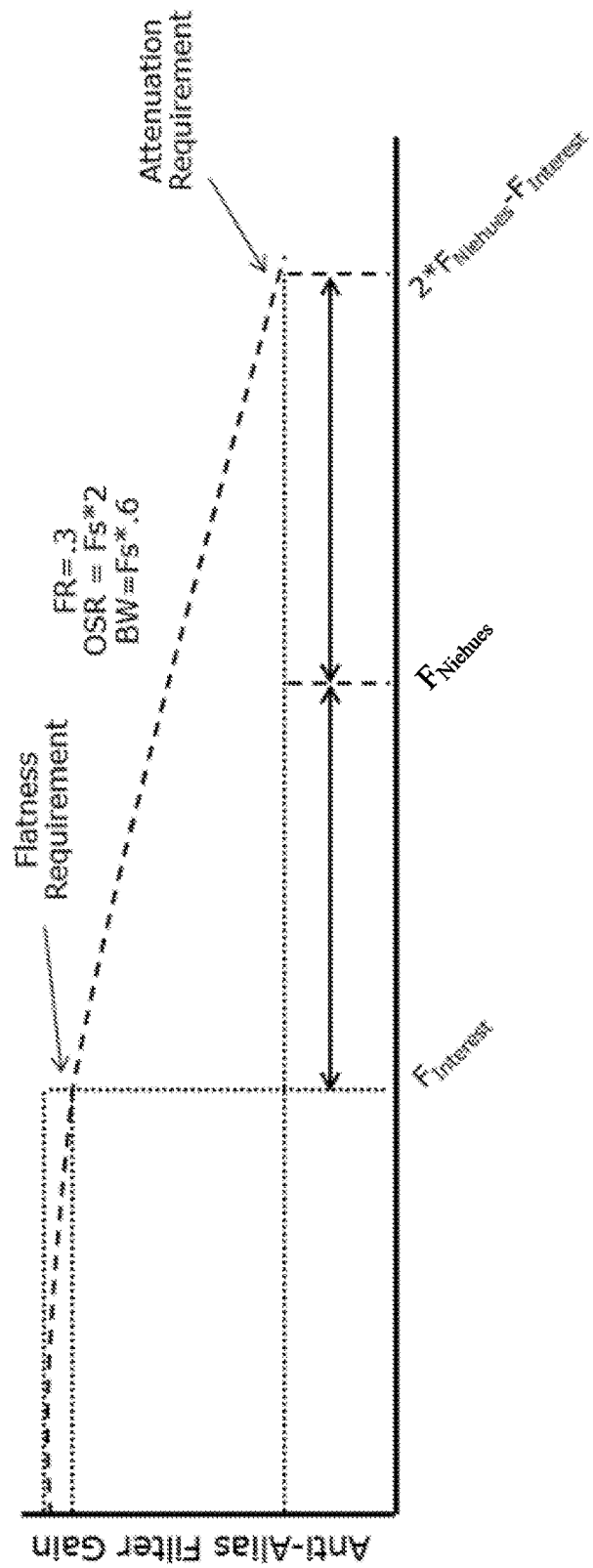
Figure 9D:
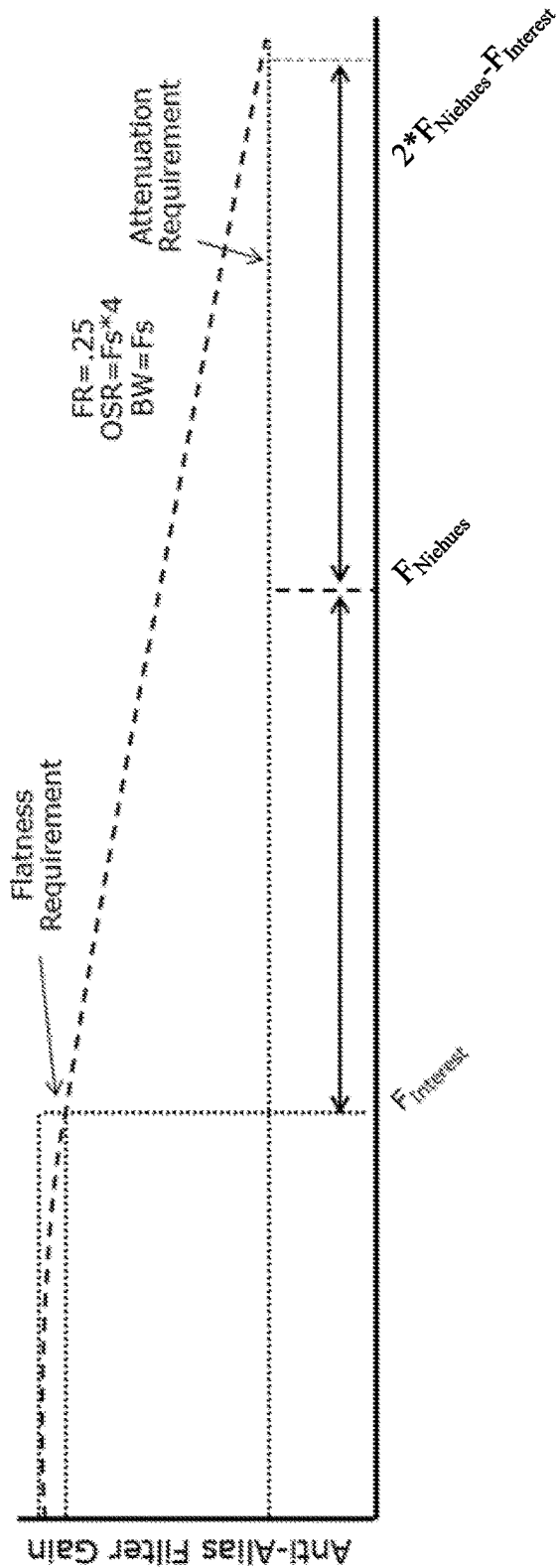

FIG. 9B depicts one or more implementations of NUS design parameters in accordance with embodiments of the present disclosure. That is, in addition to the previously described data acquisition bandwidth (DAB) and $F_S$, NUS techniques may further utilize an over sample rate (OSR) equal to the rate in samples per unit time, generally per second, that define possible sample times. As one example, a data transmission bandwidth may constrain a data acquisition system, such as data acquisition module 708 from transmitting data above a certain bandwidth. Accordingly, the previously defined DAB may be equal to the maximum data transmission rate. As the data acquisition module 708 may be capable of operating at a higher acquisition rate than the DAB, the OSR is generally greater than the DAB. That is, while the DAB may be 3800 kbs and have the ability to communicate 3,166 samples per second, the OSR may be greater than 3,166 samples/second. Therefore, a fraction of possible sample times retained for measurement (FR) may also be utilized when then the OSR is greater than $F_S$. Accordingly, the effective aliasing folding frequency which is decoupled from the total number of samples per second may be OSR/2 and equal to $F_{Niehues}$ as depicted in FIG. 9B. Thus, a desired upper frequency bound of information to be measured, ($F_{Interest}$), dictates a flatness requirement of the anti-aliasing filter. The DAB may be utilized to define $F_S$ which is equal to (FR*OSR). Accordingly, the attenuation requirement for frequencies have the potential to alias below $F_{Interest}$, that is above $2*F_{Niehues}-F_{Interest}$. FIGS. 9B-9D illustrate various combinations of BW, OSR, and FR. More specifically, combinations of OSR and FR may be chosen as long as the resulting bandwidth is less than or equal to $F_S$. In some instances, it is possible to reduce bandwidth and still gain insight into higher frequency spectral content.

As another example, suppose $F_{Interest}$ is 2,000 Hz, the data acquisition bandwidth limits the system to a collection of 3,000 samples per second (sps), and an anti-aliasing filter attenuation requirement of 20 dB exists. By selecting an OSR of 6,000 sps and utilizing a five pole analog Butterworth filter having a corner frequency of 2,000 Hz, a 20 dB attenuation at 4,000 Hz can be obtained. Because the data acquisition bandwidth limits the system to a collection of 3,000 samples per second (sps), the FR must be less than or equal to 50% (6,000 sps*50%=3,000 sps). As another example, FR could be 25% such that the resulting bandwidth is 1,500 sps.

In accordance with embodiments of the present disclosure, a sampling time ST may also be defined when utilizing NUS. The sample times are the actual timing, in seconds (or microseconds), associated with the fraction of retained samples. The sample times may be randomly selected time points associated with the OSR, such as a random permutation (retaining first % and sampling corresponding times). Alternatively, or in addition, non-limiting examples for defining sample times may include using sparse rulers and/or compressed sensors, etc. Thus, data may be sampled uniformly at the OSR and a fraction (such as FR) of the samples may be retained. Alternatively, or in addition, the data acquisition module 708 may sample data directly at the defined sample times ST.

Accordingly, a data sampling plan may define when data will be taken and may depend on (1) the frequency range of interest $F_{Interest}$ such that non-uniformly sampled data is sampled randomly in time or in an intelligently designed pattern, (2) the OSR where a higher rate allows for higher frequency insight, but at the expense of a worse signal to noise ratio (lower quality over wider range) and the selection may be linked to the characteristics of the data and the anti-aliasing filter, and (3) the percentage of points to be retained such that a fraction of the oversampled points are retained to meet bandwidth requirements (total number of samples per second) and that data may be directly measured at these time points such that a true oversample is not required from the system but is an option, where fewer samples retained results in worse signal to noise ratio.

In accordance with embodiments of the present disclosure, when only a single measurement is taken where the maximum sampling capacity is slower than the desired oversample rate, samples can be strategically retained such that no two sample points are closer in time than the maximum sample rate of the system. For example, a time step that increases/decreases a defined amount between samples (e.g., [0, 1.0, 2.1, 3.3, 4.6, 6.0, 7.5, 9.1, 10.8, 12.6, 14.5] seconds) provides information up to five Hz where a maximum sample rate capability is one sample per second. The resulting sampling plan provides high frequency sampling capability for low rate systems (for a single channel of information) and could be used in systems such as High Speed Digital Image Correlation where the maximum sample rate of the camera is about sixty frames per second.

In accordance with embodiments of the present disclosure, the optimal processing and/or reconstruction techniques for reconstructing data may be directly dependent on the characteristics of the data. Signal processing tools, such as but not limited to Lomb-Periodogram, may be utilized to reconstruct the sampled data at the analysis device 804 for example. Other tools may be utilized to optimize one or more parameters such as minimizing energy in a signal.

Figure 10:
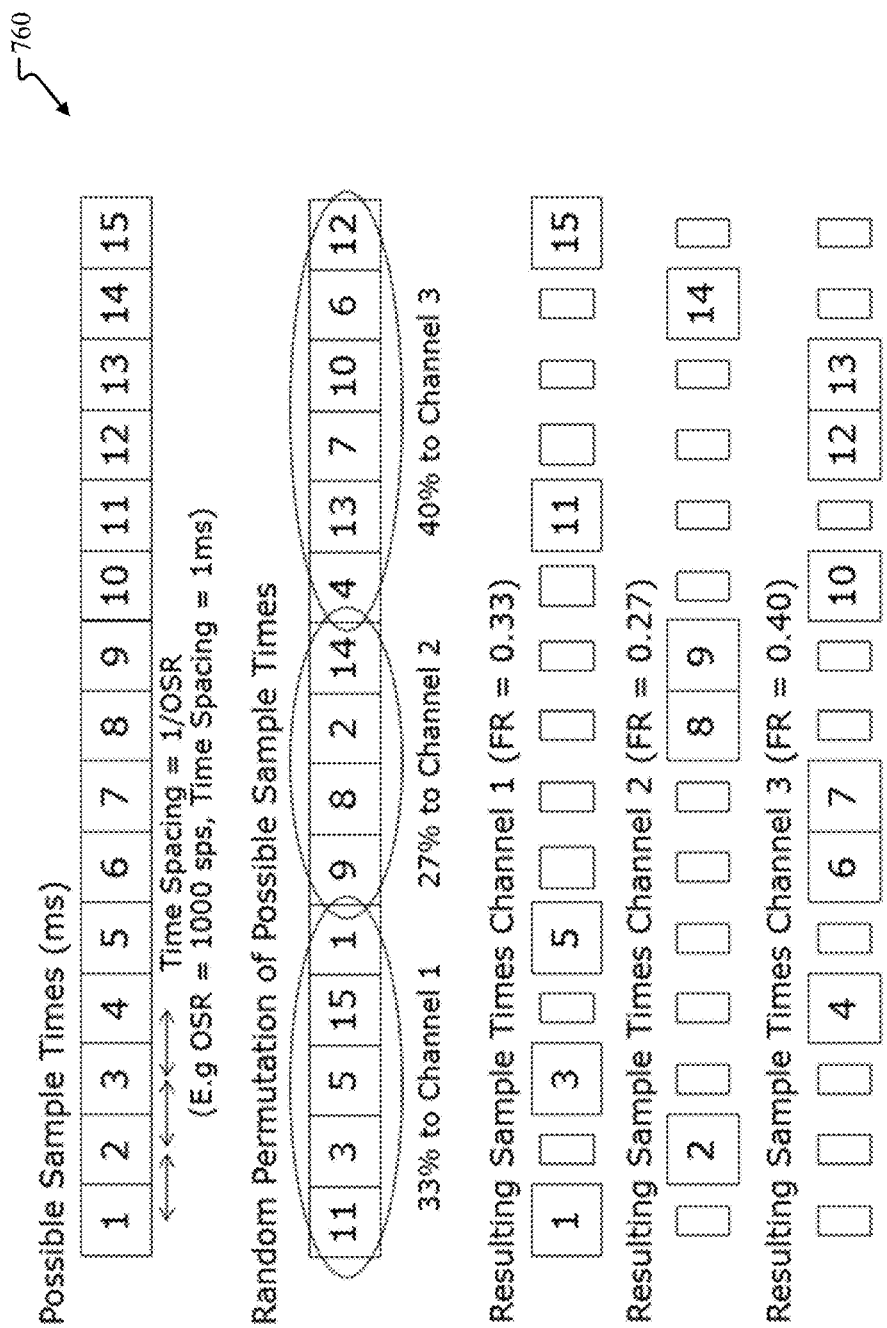
FIG. 10 depicts details of a multiplexing diagram in accordance with an exemplary embodiment of the present disclosure.

FIG. 10 depicts an example of a communication plan 760 in accordance with embodiments of the present disclosure. That is, the communication plan 760 generally indicates how and when the fraction of the retained sample data is to be communicated to the ground station 616. The communication plan 760 may provide an option to send one or more random permutation of sample times, or in some embodiments, send all of the sample times on different communication channels. Alternatively, or in addition, a fraction of the potential sample times is measured for a particular channel, where the fraction is defined based upon the required bandwidth. Multiple channels may be multiplexed together such that for measurements that all have the same oversample rate, a random permutation such as a scramble is created out of all the potential sample times. Then, the first fraction retained to one measurement is allocated, followed by the next fraction and so on and so forth. The total fractions may add up to 100% or the allocated bandwidth fraction.

Figure 11A:
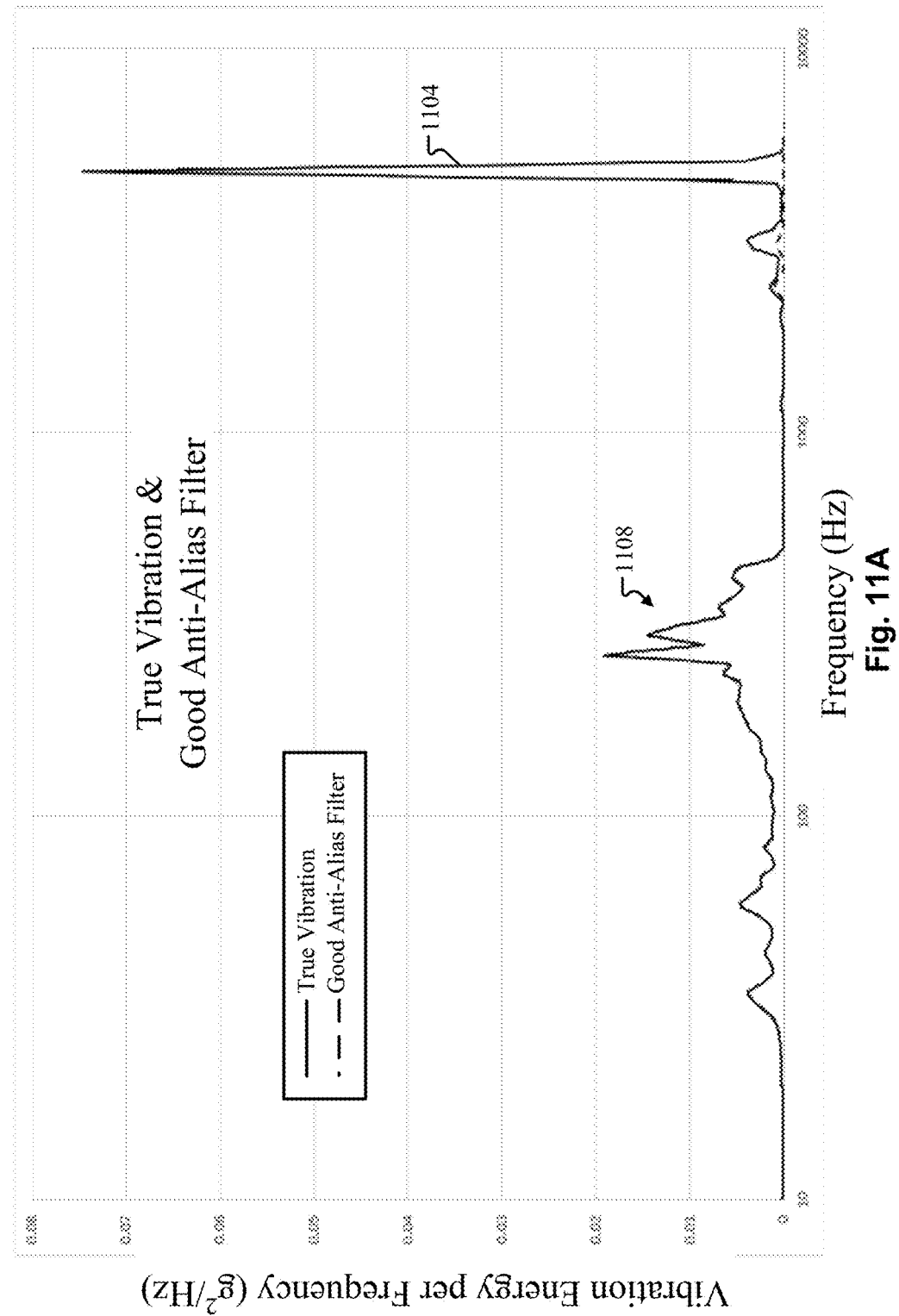
FIGS. 11A-11C depict first uniform sampling vs. non-uniform sampling charts with a good anti-alias filter in accordance with an exemplary embodiment of the present disclosure.
Figure 11B:
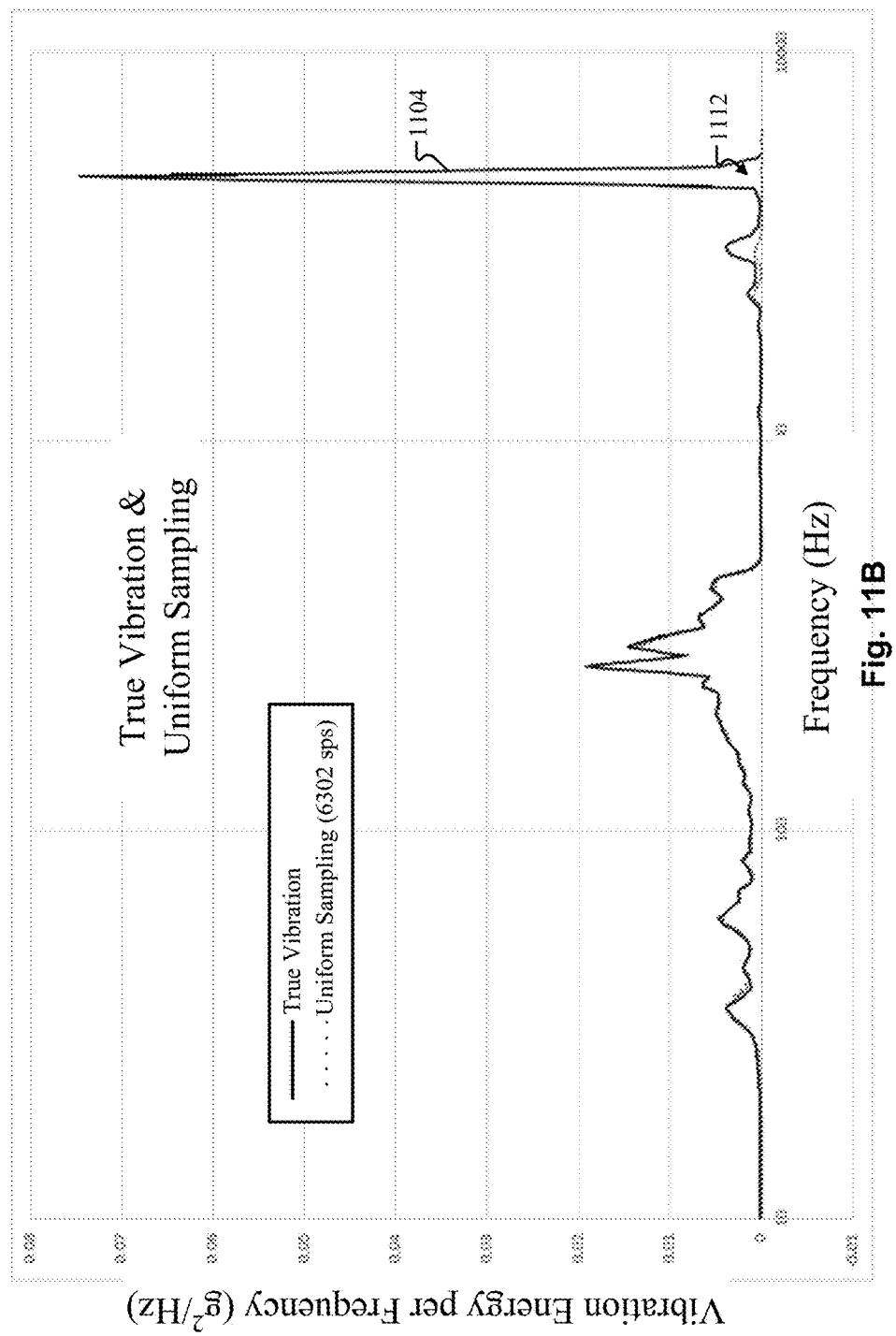
Figure 11C:
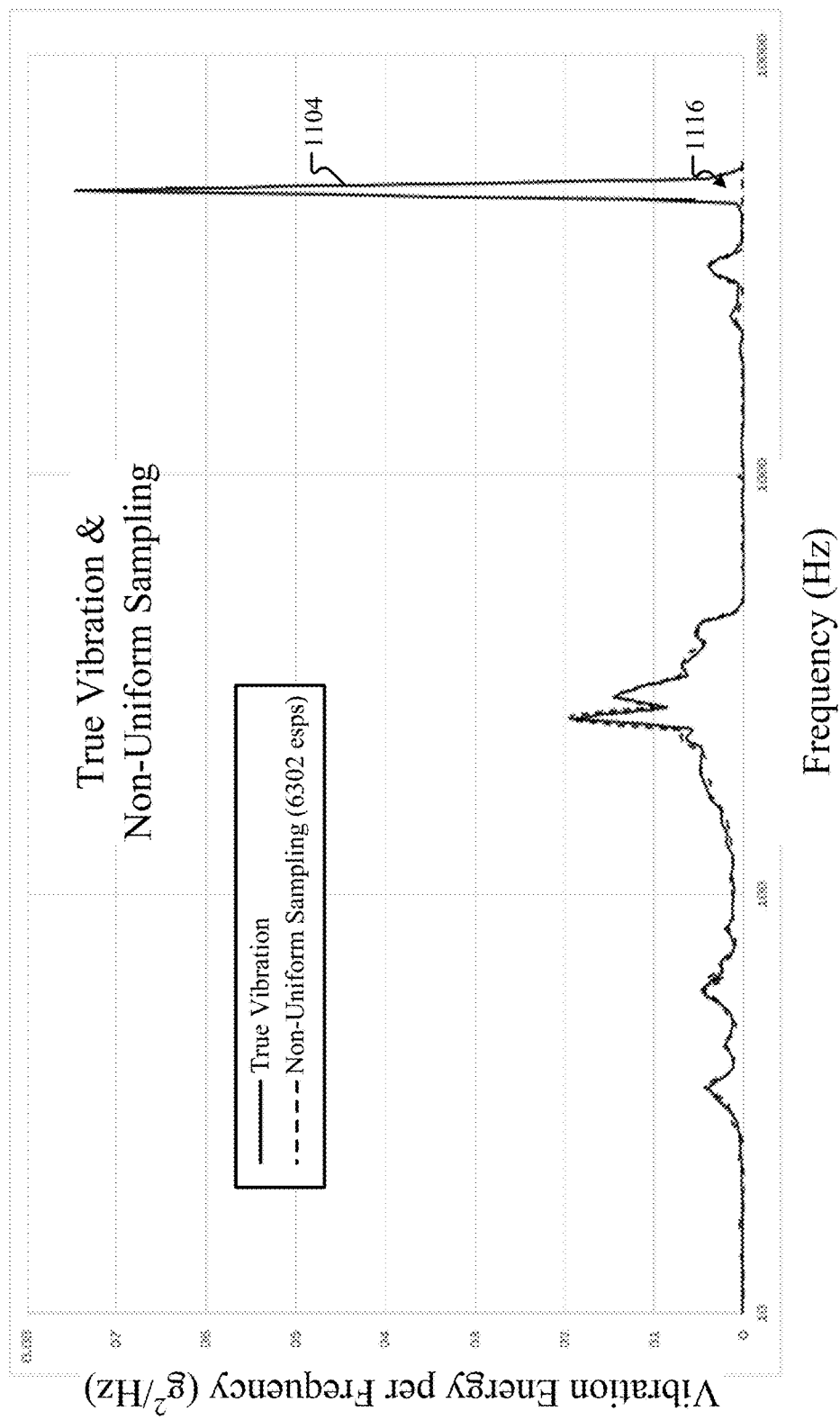
Figure 13A:
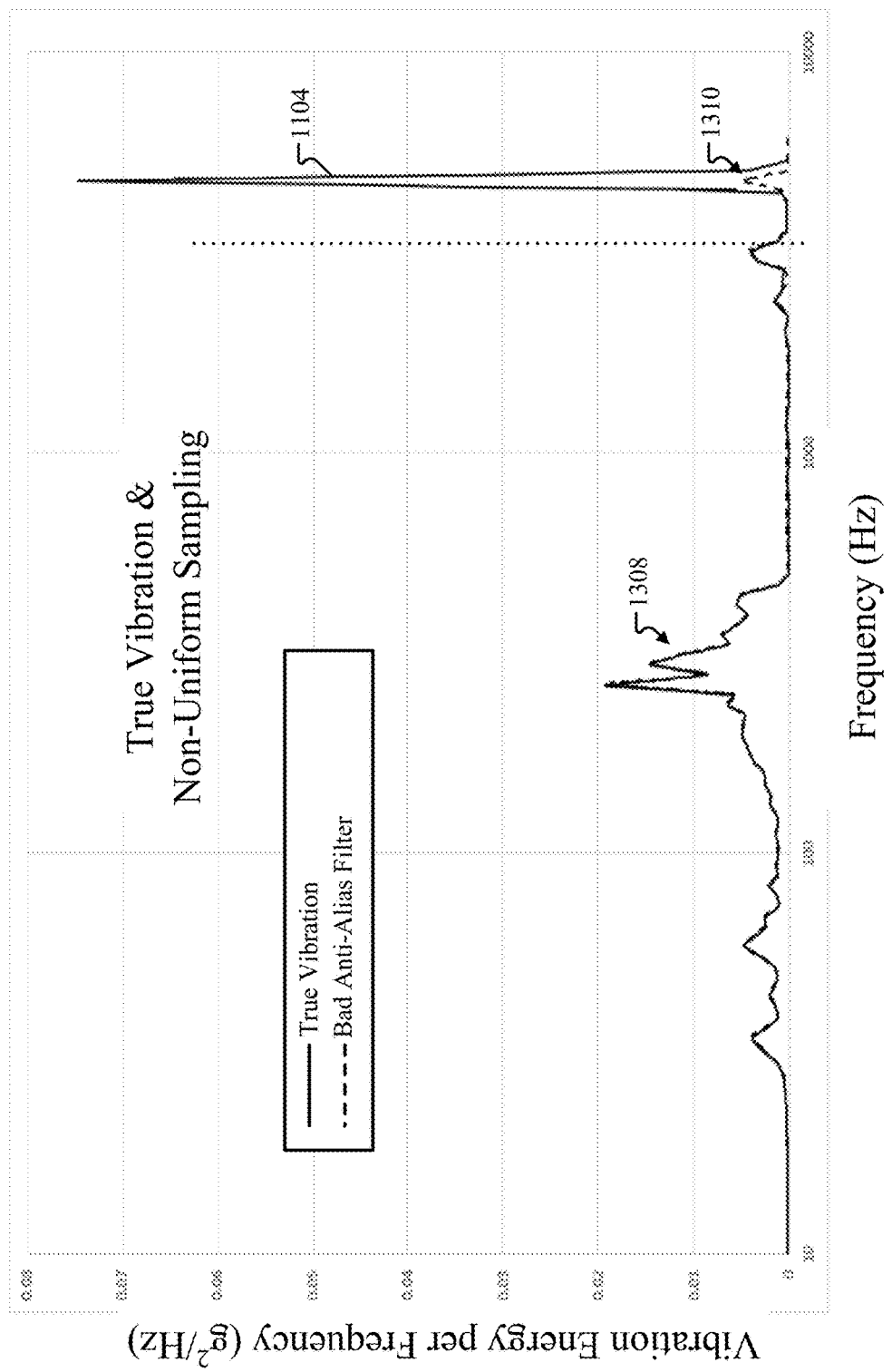
Figure 13B:
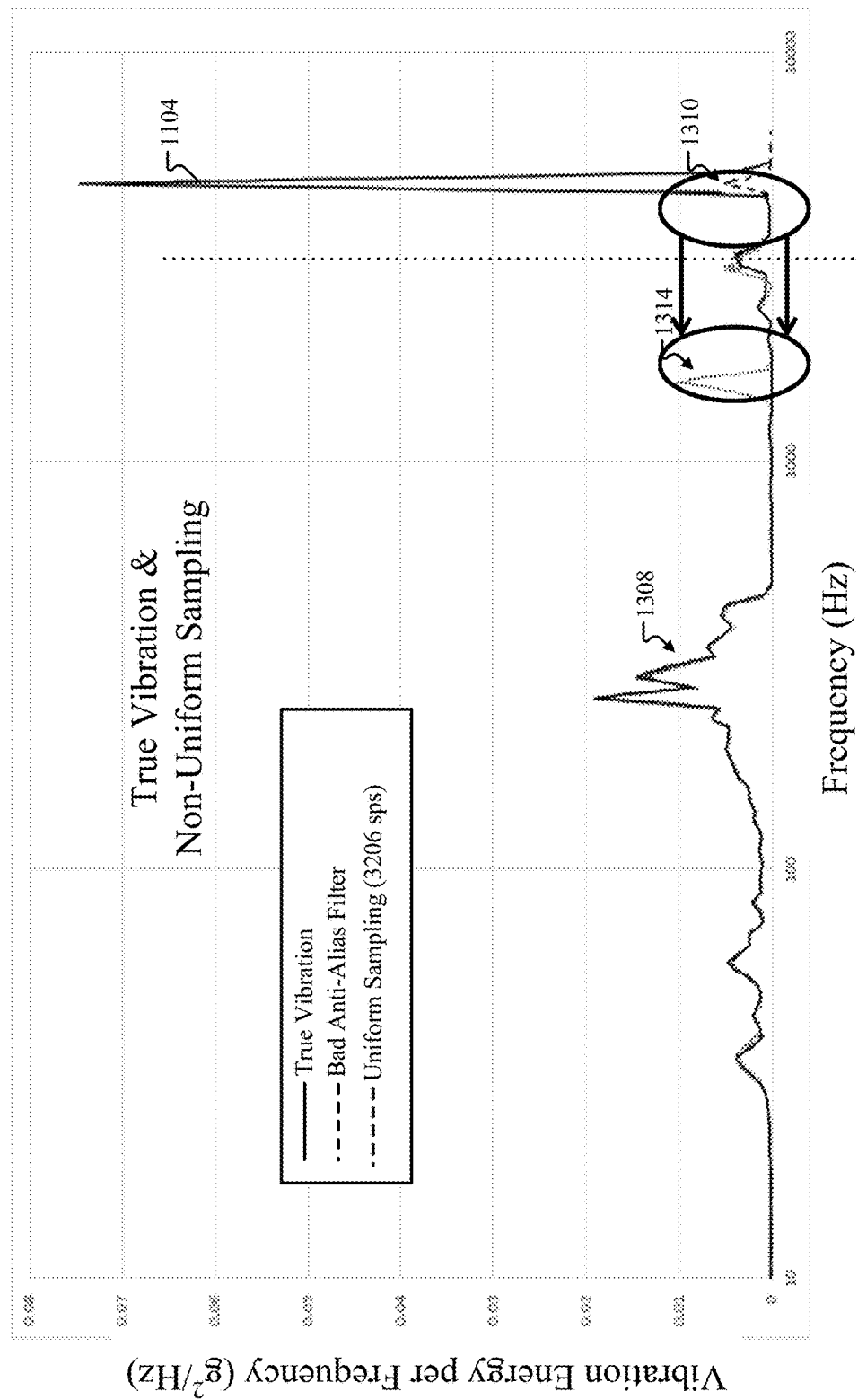

FIGS. 11A-11C generally depict an implementation of a uniform sampling technique and a non-uniform sampling technique in accordance with embodiments of the present disclosure. More specifically, FIG. 11A depicts a true vibration signal 1104 and a signal 1108 resulting from the application of an anti-aliasing filter. That is, a good anti-alias filter removes all vibration above a specific frequency range. When a good anti-alias filter is applied, a uniform sampling technique can provide accurate measurements, as depicted in FIG. 11B and signal 1112. FIG. 11C illustrates that a non-uniform sampling technique provides accurate measurements but to a higher frequency than uniform sampling techniques, as indicated by the signal 1116. Further, as illustrated in FIGS. 12A and 12B, when implementing a NUS technique, only the residual energy above $F_{Threshold}$ can corrupt, or alias, data within the frequency range of interest. However, because the energy above $F_{Threshold}$ is attenuated to a higher degree than the energy between $F_{Niehues}$ and the $F_{Threshold}$, the energy does not corrupt the important ranges of interest. FIGS. 13A-13C further illustrate this concept in accordance with embodiments of the present disclosure. That is, a true vibration signal 1104 is again illustrated in FIG. 13A. The application of a bad anti-aliasing filter indicates that energy is still present, as indicated by the frequency content of signal 1308 existing in the filtered region 1310. That is, not all of the high frequency vibration has been removed. As depicted in FIG. 13B, the application of a uniform sampling technique causes high frequency vibrations 1310 to appear as a lower frequency vibration 1314. FIG. 13B illustrates the effect of aliasing. However, the application of a non-uniform sampling technique indicates that high frequency content, or energy, exists as illustrated by the peak 1318 of the resulting signal 1316. Thus, NUS provides a correct measurement (e.g., a measurement of the attenuated signal) and also reads the true high frequency peak.

In accordance with some embodiments of the present disclosure, the indication of the high frequency peak provided by the NUS technique may be utilized to verify correct operation of the anti-aliasing filter. For example, when the non-uniformly sampled data is processed and a signal is later reconstructed, the presence and/or absence of high frequency content may be utilized to determine how good, or how deficient, an antialiasing filter is. That is, one way that NUS can be used to verify an anti-alias filter is by providing higher frequency insight into a frequency region that includes no identifiable peaks, while using the same bandwidth. Alternatively, or in addition, such frequency content may be utilized to observe and identify the existence of vibrations such that a frequency range of interest may need to be increased.

Figure 14:
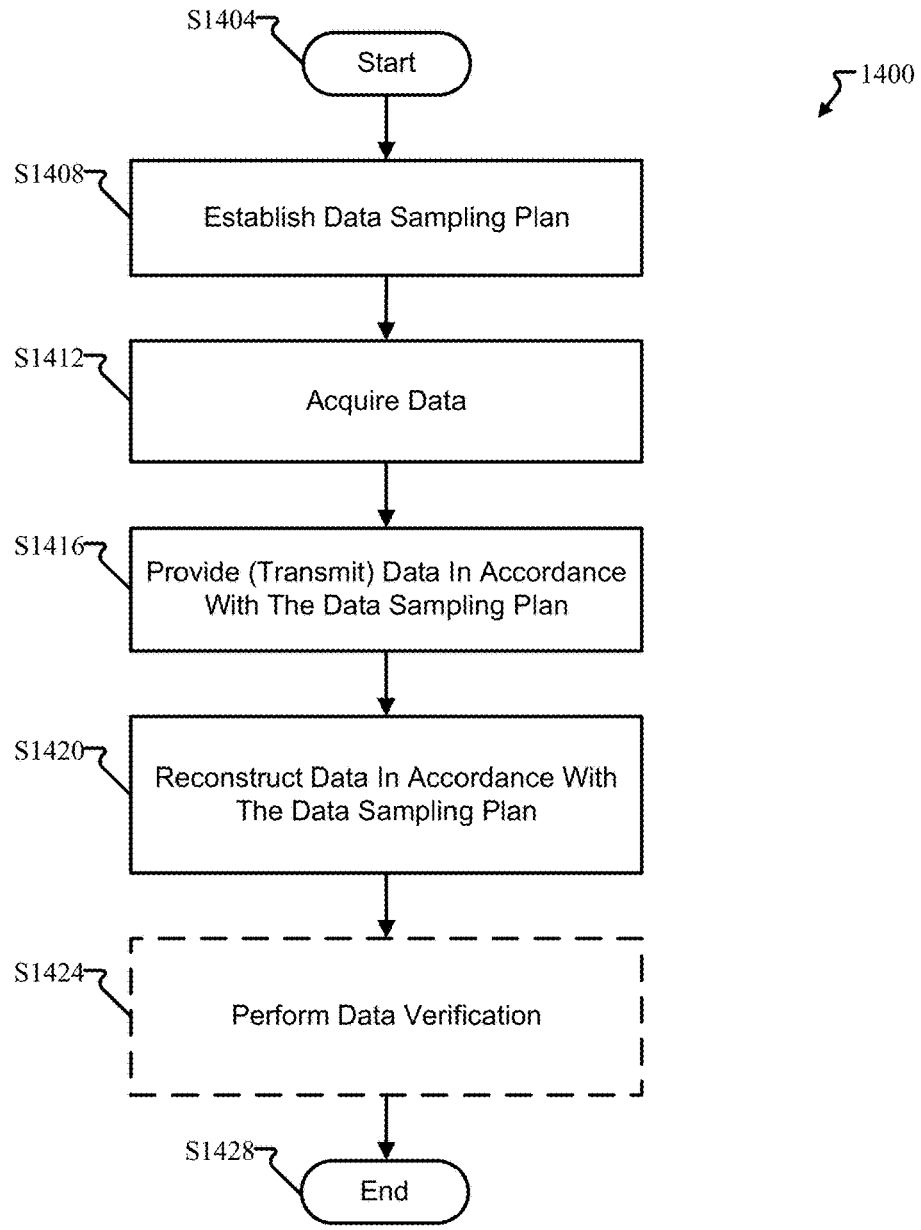
FIG. 14 depicts a first flow diagram of a first method in accordance with embodiments of the present disclosure.

Referring now to FIG. 14, a method 1400 for implementing a non-uniform sampling technique will be discussed in accordance with embodiments of the present disclosure. Method 1400 is in embodiments performed by one or more devices, such as the one or more devices included in the system 600, the data acquisition module 708, and/or the data analysis module 808. More specifically, one or more hardware and software components including the data acquisition module 708, and/or a data analysis module 808 may be involved in performing method 1400. In one embodiment, one or more of the previously described modules and/or devices perform one or more of the steps of method 1400. The method 1400 may be executed as a set of computer-executable instructions, executed by a data acquisition module 708 or the data analysis module 808, and/or encoded or stored on a computer-readable medium. Hereinafter, the method 1400 shall be explained with reference to systems, components, modules, software, etc. described with reference to FIGS. 1-14.

Method 1400 may continuously flow in a loop, flow according to a timed event, or flow according to a change in an operating or status parameter. Method 1400 may be initiated at step S1404 and flow to step S1408 where a data sampling plan, such as the data sampling plan 612, may be established. That is, as previously discussed, the data sampling plan 612 may define when data will be taken and may depend on: (1) the frequency range of interest $F_{Interest}$ such that non-uniformly sampled data is sampled randomly in time or in an intelligently designed pattern, (2) the OSR where a higher rate allows for higher frequency insight, but at the expense of a worse signal to noise ratio (lower quality over wider range) and the selection may be linked to the characteristics of the data and the anti-aliasing filter, and (3) the percentage of points to be retained such that a fraction of the oversampled points are retained to meet bandwidth requirements (total number of samples per second) and that data may be directly measured at these time points such that a true oversample is not required from the system but is an option, where fewer samples retained results in worse signal to noise ratio. As previously indicated data sampling plan may be provided to the data acquisition module 708 and the data analysis module 808. The data sampling plan may include updating one or more parameters of an existing data sampling plan already located at one of the data acquisition module 708 and/or the data analysis module 808.

At step S1412, data may be acquired. That is, data may be sampled in accordance with the data sampling plan 612. The data acquisition module 708 may cause the data to be sampled as previously discussed. For example, the data acquisition module 708 may sample data at specific times and/or may sample data and determine which data to forgo. At step S1416, the data acquisition module 708 may cause sample data to be sent to the data analysis module 808 as previously discussed. That is, the data acquisition module 708 may transmit the data in accordance with a communication plan 760 to the data analysis module 808, ground station 616, and/or another entity. At step S1420, the sampled data may be processed and/or reconstructed as previously discussed. That is, the data analysis module 808 may reconstruct the data in accordance with one or more of the data sampling plan 756 and/or the communication plan 760. At step S1424, a data verification process may be performed in accordance with FIG. 17. Alternatively, or in addition, the method 1400 may end at step S1428.

Figure 15:
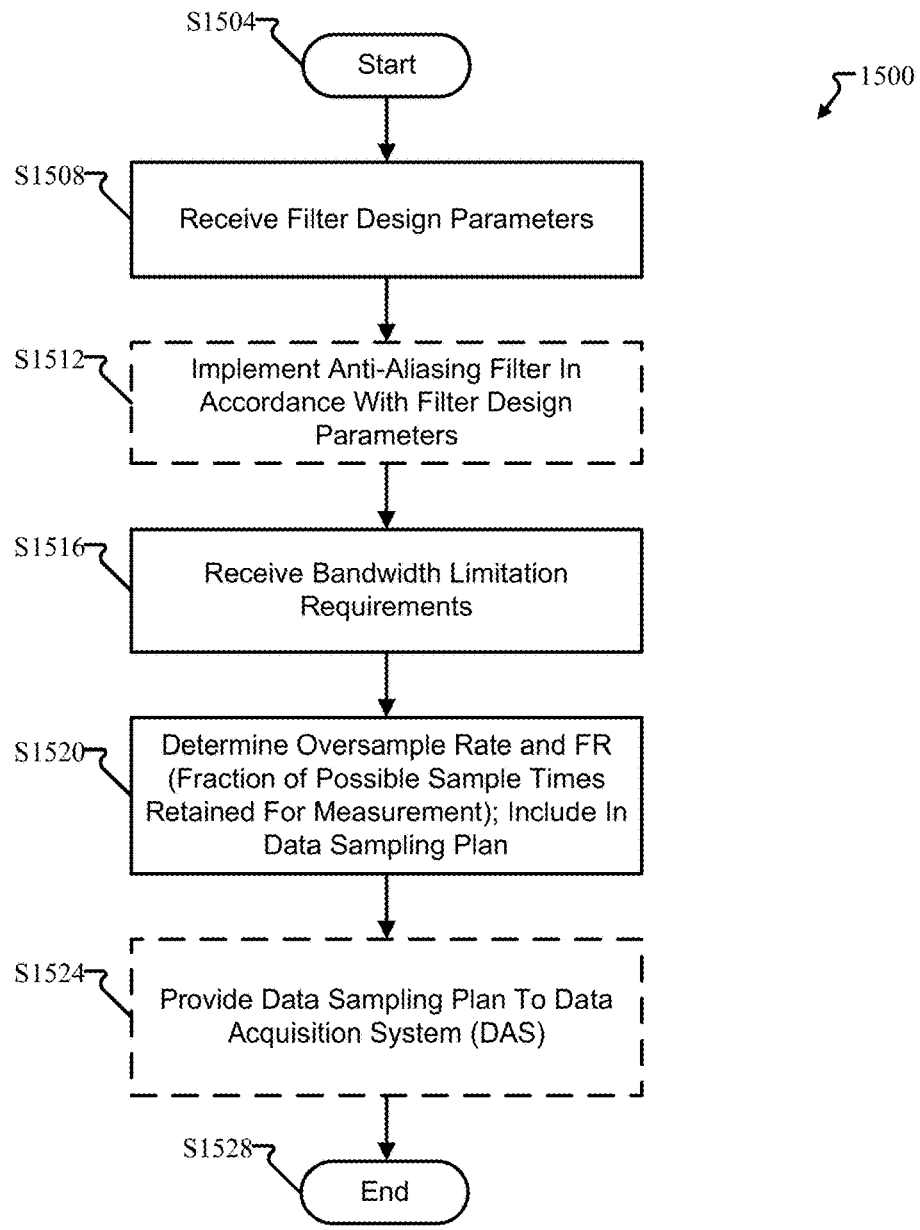
FIG. 15 depicts a second flow diagram of a first method in accordance with embodiments of the present disclosure.

Referring now to FIG. 15, a method 1500 providing additional details of the step S1408 for establishing a data sampling plan will be discussed in accordance with embodiments of the present disclosure. Method 1500 is in embodiments performed by one or more devices, such as the one or more devices included in the system 600, the data acquisition module 708, and/or the data analysis module 808. More specifically, one or more hardware and software components including the data acquisition module 708, and/or a data analysis module 808 may be involved in performing method 1500. In one embodiment, one or more of the previously described modules and/or devices perform one or more of the steps of method 1500. The method 1500 may be executed as a set of computer-executable instructions, executed by a data acquisition module 708 or the data analysis module 808, and/or encoded or stored on a computer-readable medium. Hereinafter, the method 1500 shall be explained with reference to systems, components, modules, software, etc. described with reference to FIGS. 1-15.

Method 1500 may continuously flow in a loop, flow according to a timed event, or flow according to a change in an operating or status parameter. Method 1500 may be initiated at step S1504 and flow to step S1508 where one or more filter design parameters are received. Such filter design parameters may include a flatness requirement, a corner frequency, and/or a 20 dB frequency for example. Accordingly, an anti-aliasing filter may be designed and implemented with such parameters at step S1512. In accordance with embodiments of the present disclosure, an anti-aliasing filter 724 may be physically removed and replaced with a new anti-aliasing filter 724. Alternatively, or in addition, the anti-aliasing filter 724 may be reprogrammed such that one or more characteristics of a passive and/or active component is varied. Method 1500 may then proceed to step S1516 where a bandwidth limitation, such as a DAB is received. Based on the bandwidth limitation and/or the flatness requirement of the anti-aliasing filter 724, an oversample rate and a FR may be determined at step S1520 and included in the data sampling plan 612 as previously discussed. At step S1524, the data sampling plan 612 may be provided to a data acquisition system, such as data acquisition module 708, and/or the data analysis module 808. Method 1500 may end at step S1528.

Figure 16:
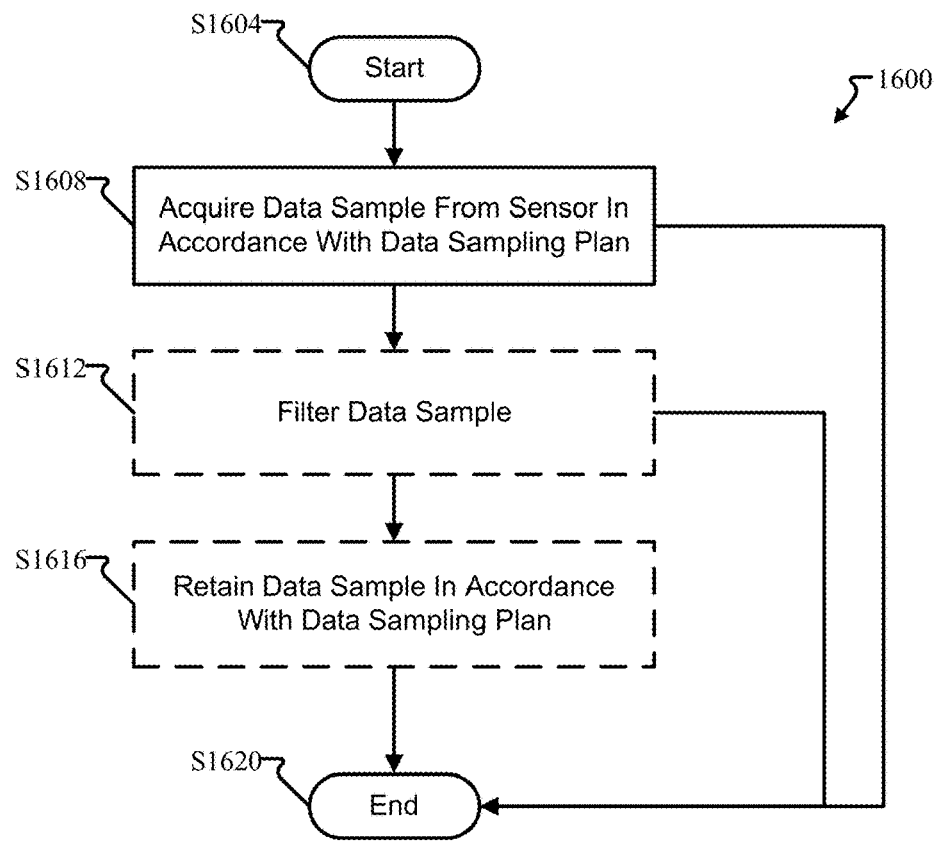
FIG. 16 depicts a third flow diagram of a first method in accordance with embodiments of the present disclosure.

Referring now to FIG. 16, a method 1600 providing additional details of the step S1412 for acquiring data will be discussed in accordance with embodiments of the present disclosure. Method 1600 is in embodiments performed by one or more devices, such as the one or more devices included in the system 600 and/or the data acquisition module 708. More specifically, one or more hardware and software components including the data acquisition module 708 may be involved in performing method 1600. In one embodiment, one or more of the previously described modules and/or devices perform one or more of the steps of method 1600. The method 1600 may be executed as a set of computer-executable instructions, executed by a data acquisition module 708 and/or encoded or stored on a computer-readable medium. Hereinafter, the method 1600 shall be explained with reference to systems, components, modules, software, etc. described with reference to FIGS. 1-16.

Method 1600 may continuously flow in a loop, flow according to a timed event, or flow according to a change in an operating or status parameter. Method 1600 may be initiated at step S1604 and flow to step S1608 where data is sampled and acquired from one or more sensors 704. As previously discussed, the samples may be acquired in accordance with a sampling rate such that some of the samples are discarded. Alternatively, or in addition, the samples may be acquired in accordance with a specific sampling plan where data is only acquired at established sampling times. Method 1600 may proceed to step S1612 where such data may be filtered. Alternatively, or in addition, Method 1600 may proceed from step S1608 to step S1620 where the method ends. Method 1600 may proceed from step S1612 to step S1616 where the sampled data may be stored in accordance with the sampling plan 612. That is, the sampled data may be saved to one or more components of the storage locations 744. Alternatively, or in addition, Method 1600 may proceed from step 1612 to step 1620. Method 1600 may end at step S1620.

Figure 17:
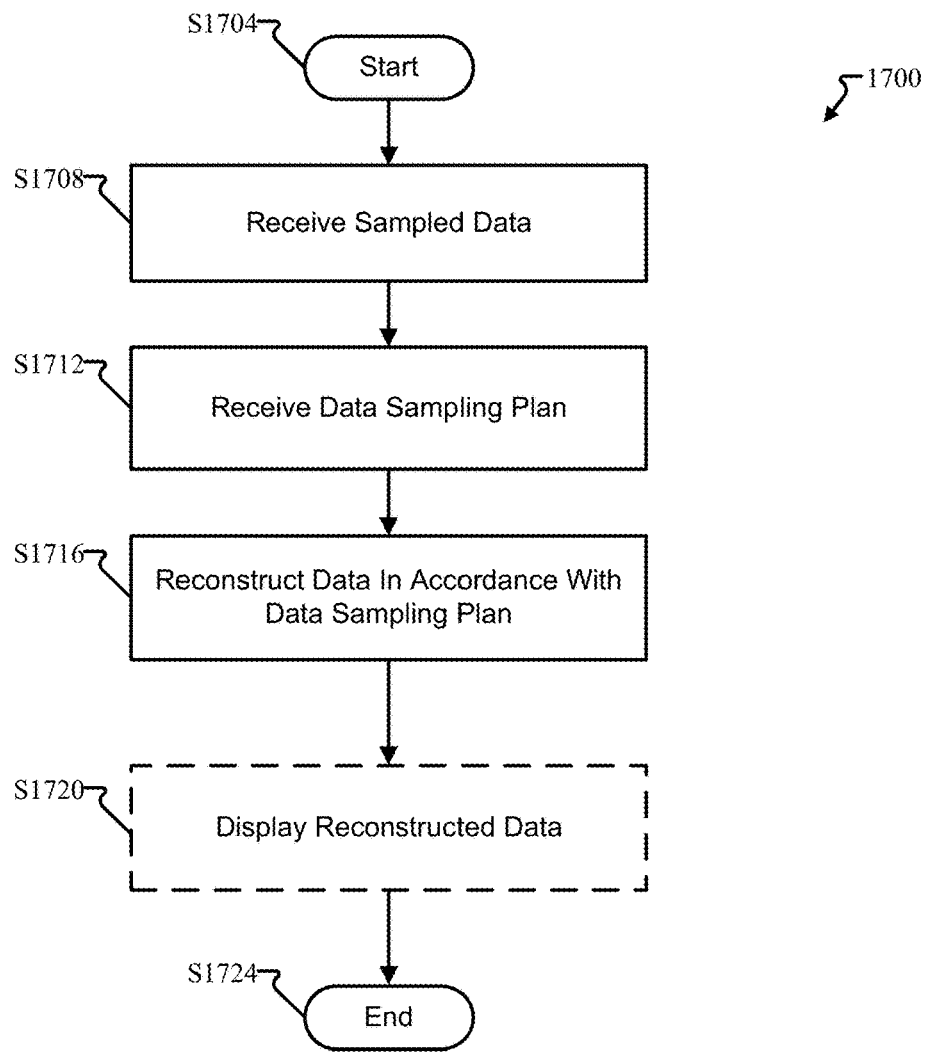
FIG. 17 depicts a fourth flow diagram of a first method in accordance with embodiments of the present disclosure.

Referring now to FIG. 17, a method 1700 providing additional details of the step S1420 for reconstructing data in accordance with the data sampling plan 612 will be discussed in accordance with embodiments of the present disclosure. Method 1700 is in embodiments performed by one or more devices, such as the one or more devices included in the system 600 and/or the data analysis module 808. More specifically, one or more hardware and software components including the data analysis module 808 may be involved in performing method 1700. In one embodiment, one or more of the previously described modules and/or devices perform one or more of the steps of method 1700. The method 1700 may be executed as a set of computer-executable instructions, executed by a data analysis module 808 and/or encoded or stored on a computer-readable medium. Hereinafter, the method 1700 shall be explained with reference to systems, components, modules, software, etc. described with reference to FIGS. 1-17.

Method 1700 may continuously flow in a loop, flow according to a timed event, or flow according to a change in an operating or status parameter. Method 1700 may be initiated at step S1704 and flow to step S1708 where data sampled data is received at the data analysis module 808 for example. The method 1700 may then flow to step S1712, where the data sampling plan 612 for example, is received if the plan hasn't already been received. In accordance with embodiments of the present disclosure, the method 1700 may flow to step 1716 such that the sampled data is processed and reconstructed as previously described. In some embodiments, the method 1700 may flow to step S1720 where a graph, report, or summary, such as the report 628 is displayed to an output device. Method 1700 may then proceed to step S1724 to end.

Figure 18:
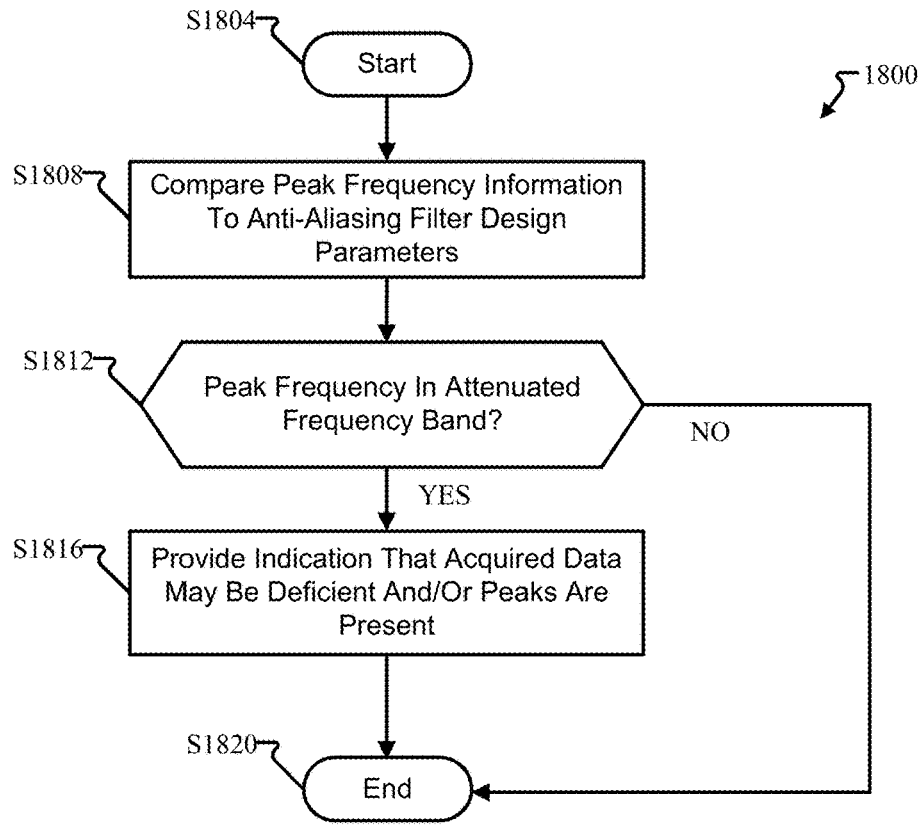
FIG. 18 depicts a fifth flow diagram of a first method in accordance with embodiments of the present disclosure.

Referring now to FIG. 18, a method 1800 providing additional details of the step S1424 for performing a data verification function will be discussed in accordance with embodiments of the present disclosure. Method 1800 is in embodiments performed by one or more devices, such as the one or more devices included in the system 600 and/or the data analysis module 808. More specifically, one or more hardware and software components including the data analysis sis module 808 may be involved in performing method 1800. In one embodiment, one or more of the previously described modules and/or devices perform one or more of the steps of method 1800. The method 1800 may be executed as a set of computer-executable instructions, executed by a data analysis module 808 and/or encoded or stored on a computer-readable medium. Hereinafter, the method 1800 shall be explained with reference to systems, components, modules, software, etc. described with reference to FIGS. 1-18.

Method 1800 may continuously flow in a loop, flow according to a timed event, or flow according to a change in an operating or status parameter. Method 1800 may be initiated at step S1804 and flow to step S1808 where peak frequency information may be compared to the anti-aliasing filter design parameters. As previously discussed with respect to FIGS. 13A-C, the presence of frequency peaks within a frequency band that is supposed to be sufficiently attenuated may indicate that the anti-aliasing filter 724 is not working and/or is deficient in some manner. Accordingly, if peak frequency information exists in an attenuated band at step S1812, the method 1800 may proceed to step S1816 and provide a notification and/or indication indicating that the acquired data (e.g., sampled data), may be deficient and/or that peak frequency information is present. The presence of peak information may indicate that vibrations previously thought to be non-existent may actually exist. Method 1800 may end at step S1820.

Figure 19:
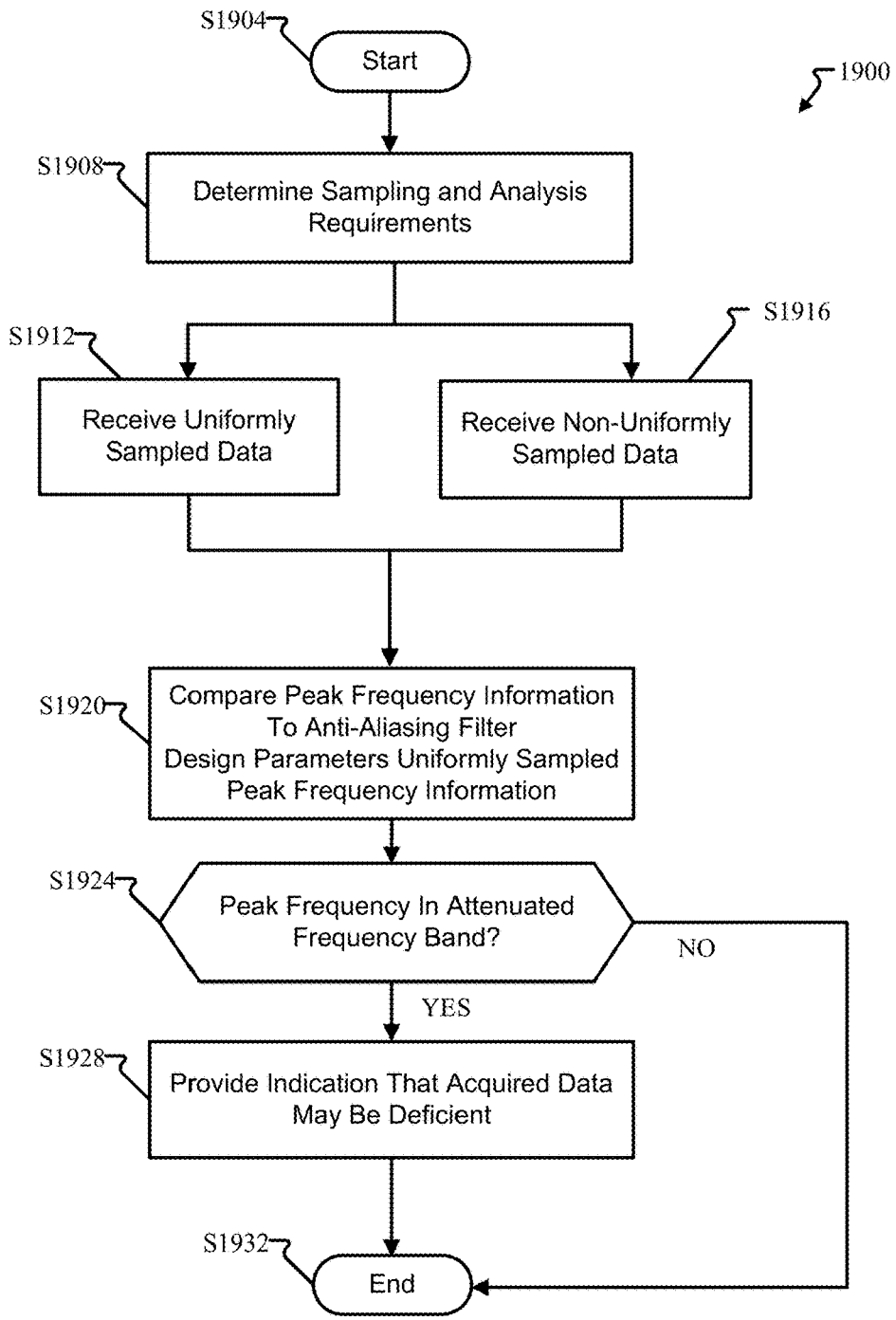
FIG. 19 depicts a sixth flow diagram of a first method in accordance with embodiments of the present disclosure.

Referring now to FIG. 19, a method 1900 providing details for performing data verification of uniformly sampled data in accordance with embodiments of the present disclosure will be described. Method 1900 is in embodiments performed by one or more devices, such as the one or more devices included in the system 600 and/or the data analysis module 808. More specifically, one or more hardware and software components including the data analysis module 808 may be involved in performing method 1900. In one embodiment, one or more of the previously described modules and/or devices perform one or more of the steps of method 1900. The method 1900 may be executed as a set of computer-executable instructions, executed by a data analysis module 808 and/or encoded or stored on a computer-readable medium. Hereinafter, the method 1900 shall be explained with reference to systems, components, modules, software, etc. described with reference to FIGS. 1-19.

Method 1900 may continuously flow in a loop, flow according to a timed event, or flow according to a change in an operating or status parameter. Method 1900 may be initiated at step S1904 and flow to step S1908 where a sampling and analysis requirements process may be performed to determine one or more parameters needed to uniformly and non-uniformly sample measurement values associated with a component of interest. That is, uniform sampling and non-uniform sampling of a component of interest may be performed in parallel; thus, a frequency of interest, and oversample rate, and/or a fraction of samples retained may be determined. Accordingly, a data sampling plan may indicate sampling times for uniform sampling as well as indicate sampling times for non-uniform sampling. At step S1912, the uniformly sampled data of the component of interest is received in accordance with the previously determined parameters of step S1908. At step S1916, the non-uniformly sampled data of the component of interest is then received in accordance with the previously determined parameters of step S1916. At step S1920, the uniformly sampled data may be converted from the time domain into the frequency domain and the non-uniformly sampled data may be converted from the time domain into the frequency domain. The peak frequency information for the non-uniformly sampled data may be compared to at least one of the anti-aliasing design parameters and/or to the uniformly sampled peak frequency information. If peak frequency information exists within the supposedly attenuated frequency band, then the method 1900 proceeds to step S1928 where a notification and/or indication indicating that the acquired data (e.g. sampled data), may be deficient and/or that peak frequency information is present may be provided to a display device. As previously discussed with respect to FIGS. 13A-C, the presence of frequency peaks within a frequency band that is supposed to be sufficiently attenuated may indicate that the anti-aliasing filter 724 is not working and/or is deficient in some manner. Accordingly, if peak frequency information exists in an attenuated band at step S1912, the method 1900 may proceed to step S1916 and provide a notification and/or indication indicating that the acquired data (e.g. sampled data), may be deficient and/or that peak frequency information is present. The presence of peak information may indicate that vibrations previously thought to be non-existent may actually exist.

That is, additional information may be gained by performing uniform sampling and NUS in parallel. The NUS would start from a higher over sample rate than that used by the uniform sampling. For example, uniformly sampled data may be obtained at 4,000 samples per second and NUS may be performed at an oversample rate of 40,000 samples per second, where only 10% of the sampled points are retained. The NUS approach would provide insight up to 20,000 Hz. The NUS peak frequency information can be compared to the peak frequency information for the uniformly sampled data to verify the anti-alias filters. Alternatively, or in addition, the absence of NUS frequency information above the Nyquist frequency of the uniformly sampled signal (e.g. 2,000 Hz) and the Niehues frequency of the NUS signal (e.g. 20,000 Hz) would tend to indicate that the anti-alias filter is working correctly. That is, energy present above the Nyquist frequency and the Niehues frequency in this range would alias if uniform sampling was used.

Although FIG. 19 depicts performing uniform sampling and NUS in parallel, uniform sampling and NUS sampling may be performed in series. That is, data may be captured for a first launch of a launch vehicle using uniform sampling and/or NUS techniques. For a subsequent launch, the bandwidth/sample rate may be reduced because known concerns with aliasing may not exist. Thus, data sampling for the latter launch could either be uniform sampling or NUS with a lower over sample rate (which would provide a better noise floor at the expense of less insight into the higher frequencies). Method 1900 may end at step S1932.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A system comprising:
   a sensor; and
   a data acquisition system adapted to receive sensor data from the sensor and transmit the received sensor data to a receiving entity, the data acquisition system including:
   at least one processor, and
   memory storing one or more program instructions that when executed by the at least one processor, execute the steps of:
   receiving a plurality of parameters associated with a non-uniform data sampling plan, the plurality of parameters including an oversample rate and further indicating when to sample sensor data from the sensor in a non-uniform manner, and
   acquiring data samples in accordance with the plurality of parameters,
   wherein the oversampling rate is greater than or equal to a data sample transmission bandwidth, and
   wherein the data sample transmission bandwidth is a data sample transmission rate from the data acquisition system to the receiving entity for data samples acquired from the sensor and having a selected sample resolution.

2. The system of claim 1, wherein the sample resolution is a number of bits per data sample.

3. The system of claim 1 further comprising:
discarding a fraction of the acquired data samples in accordance with the non-uniform data sampling plan.

4. The system of claim 3, wherein the acquired data samples are discarded in a randomized manner.

5. The system of claim 1, further comprising:
a data analysis system adapted to receive the data samples having the oversampling rate that is greater than or equal to the data sample transmission bandwidth, the data analysis system including:
at least one processor, and
memory storing one or more program instructions that when executed by the at least one processor of the data analysis system, execute the steps of:
receiving the data samples having the oversampling rate that is greater than or equal to the data sample transmission bandwidth, and
identifying peak frequency information from spectral content of the received data samples, wherein the peak frequency information includes at least one frequency that is greater than a Nyquist frequency associated with the data sample transmission bandwidth of the data acquisition system.

6. The system of claim 1, wherein the sensor senses acceleration.

7. The system of claim 1, wherein the system resides at one or more of a launch vehicle or an electro-dynamic shaker.

8. The system of claim 1, wherein an amount of time between adjacent data samples varies between adjacent samples.

9. A method for obtaining data samples by a data acquisition system, the method comprising:
selecting an anti-aliasing filter corner frequency for an anti-aliasing filter equal to a first frequency;
selecting an oversampling rate that is greater than or equal to a data sample transmission bandwidth, wherein the data sample transmission bandwidth is a data sample transmission rate from a data acquisition system to a receiving entity for data samples acquired from a sensor and having a selected sample resolution;
acquiring data samples at the oversampling rate with the data acquisition system; and
transmitting a fraction of the acquired data samples in accordance with the data sample transmission bandwidth.

10. The method of claim 9, further comprising:
selecting an attenuation requirement for spectral content above the oversampling rate less the first frequency; and
selecting a type and order of the anti-aliasing filter such that the attenuation requirement for the spectral content above the oversampling rate less the first frequency is met.

11. The method of claim 10, wherein the fraction of the acquired data samples is less than or equal to the data sample transmission bandwidth divided by the oversampling rate.

12. The method of claim 9, further comprising:
acquiring the data samples from a sensor that measures acceleration.

13. The method of claim 9, wherein an amount of time between adjacent data samples varies between adjacent samples.

14. The method of claim 9, further comprising:
identifying peak frequency information from spectral content of the acquired data samples, wherein the peak frequency information includes at least one frequency that is greater than a Nyquist frequency associated with the data sample transmission bandwidth of the data acquisition system.

15. The method of claim 14, further comprising:
comparing the peak frequency information to the corner frequency; and
determining that the anti-aliasing filter is deficient.

16. A method for obtaining data samples by a data acquisition system, the method comprising:
selecting an anti-aliasing filter corner frequency equal to a first frequency;
selecting an oversampling rate that is greater than or equal to a data sample transmission bandwidth, wherein the data sample transmission bandwidth is a data sample transmission rate from a data acquisition system to a receiving entity for data samples acquired from a sensor and having a selected sample resolution;
determining a sample timing associated with each data sample to acquire;
acquiring a plurality of data samples at the determined sample timing; and
transmitting the acquired plurality of data samples to the receiving entity.

17. The method of claim 16, wherein an amount of time between adjacent data samples varies between adjacent samples.

18. The method of claim 16, further comprising:
acquiring the plurality of data samples from a sensor that measures acceleration.

19. The method of claim 16, further comprising:
identifying peak frequency information from spectral content of the acquired plurality of data samples, wherein the peak frequency information includes at least one frequency that is greater than a Nyquist frequency associated with the data sample transmission bandwidth of the data acquisition system.

* * * * *